US012703384B1

(12) United States Patent
Kroeger et al.

(10) Patent No.: US 12,703,384 B1
(45) Date of Patent: Aug. 11, 2026

(54) DETERMINING ERROR MEASURES ASSOCIATED WITH MAP DATA PROJECTIONS AND SENSOR DATA DETECTIONS

(71) Applicant: Zoox, Inc., Foster City, CA (US)

(72) Inventors: Till Kroeger, Chicago, IL (US); Soroush Dean Khadem, San Francisco, CA (US); Veeresh Taranalli, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 326 days.

(21) Appl. No.: 18/327,745

(22) Filed: Jun. 1, 2023

(51) Int. Cl.
*B60W 60/00* (2020.01)
*G01C 21/32* (2006.01)

(52) U.S. Cl.
CPC ........... *B60W 60/001* (2020.02); *G01C 21/32* (2013.01); *B60W 2556/40* (2020.02)

(58) Field of Classification Search
None
See application file for complete search history.

(56) References Cited

U.S. PATENT DOCUMENTS

| | | | | |
|---|---|---|---|---|
| 10,410,328 | B1 * | 9/2019 | Liu | G05D 1/0274 |
| 2020/0103236 | A1 * | 4/2020 | Adams | G01C 21/3859 |
| 2020/0166364 | A1 * | 5/2020 | Fujita | G06F 8/65 |
| 2021/0172756 | A1 * | 6/2021 | Wheeler | G06T 17/00 |
| 2021/0407101 | A1 * | 12/2021 | Ondruska | G06T 7/0002 |

* cited by examiner

*Primary Examiner* — Ramon A. Mercado
*Assistant Examiner* — David Ruben Pedersen
(74) *Attorney, Agent, or Firm* — Lee & Hayes, P.C.

(57) ABSTRACT

Techniques for determining a match prediction associated with image data and map data associated with a vehicle environment are described herein. In some cases, the techniques described herein enable determining the match prediction based on: (i) an image segment that represents at least a portion of a lane marking as detected based on the image data, and (ii) a map segment that represents at least a portion of a lane marking as determined based on the map data. In some cases, to determine the match prediction, an example system determines: (i) a set of first errors between map points associated with the map segment and the image segment, and (ii) a set of second errors between image points associated with the image segment and the map segment.

20 Claims, 9 Drawing Sheets

IDENTIFY A MAP POINT (306)
302

IDENTIFY AN IMAGE SEGMENT (312) IN IMAGE DATA
308

DETERMINE THAT A PROJECTION (316) OF THE MAP POINT ONTO A PLANE (318) SPANNED BY THE LANE FALLS OUTSIDEE THE LANE
314

DETERMINE AN ERROR BETWEEN THE MAP POINT AND THE IMAGE SEGMENT BASED ON A CLOSEST DISTANCE BETWEEN THE MAP POINT AND A RAY THAT PASSES THROUGH THE CLOSER LANE POINT
320

MAP PROJECTION DATA 304

306

312

IMAGE DETECTION DATA 310

318

306

316

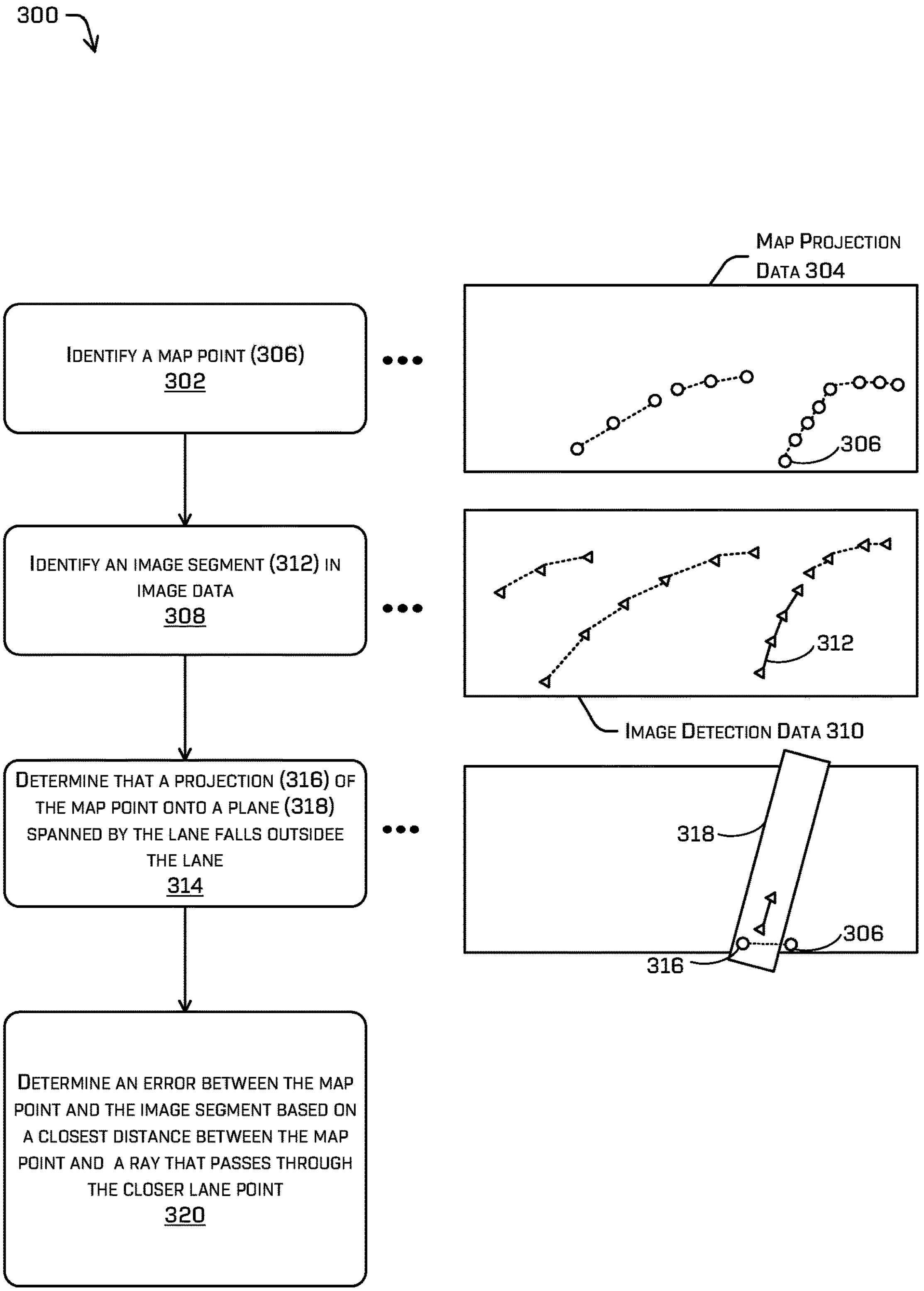

FIG. 3

IDENTIFY AN IMAGE POINT (406)
402

IMAGE DETECTION DATA 404

406

IDENTIFY A MAP SEGMENT (412)
408

412

MAP PROJECTION DATA 410

DETERMINE THAT A CONTACT POINT (416) OF A LINE (418) THAT PASSES THROUGH THE IMAGE POINT FALLS BETWEEN THE MAP SEGMENT
414

418

406

416

DETERMINE AN ERROR BASED ON A SHORTEST DISTANCE (422) OF THE LINE AND THE MAP SEGMENT
420

406

422

414

DETERMINING ERROR MEASURES ASSOCIATED WITH MAP DATA PROJECTIONS AND SENSOR DATA DETECTIONS

BACKGROUND

Autonomous vehicles perform computer vision operations such as detecting static features of a vehicle environment such as lane marks. However, computer vision operations can be inaccurate, inefficient, and/or otherwise consist of discrepancies with a map, which can present challenges when controlling the autonomous vehicle through an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 is a flowchart diagram of an example process for determining a first error associated with a map point and an image segment when there is a longitudinal mismatch between the map point and the image segment.

DETAILED DESCRIPTION

Figure 1:
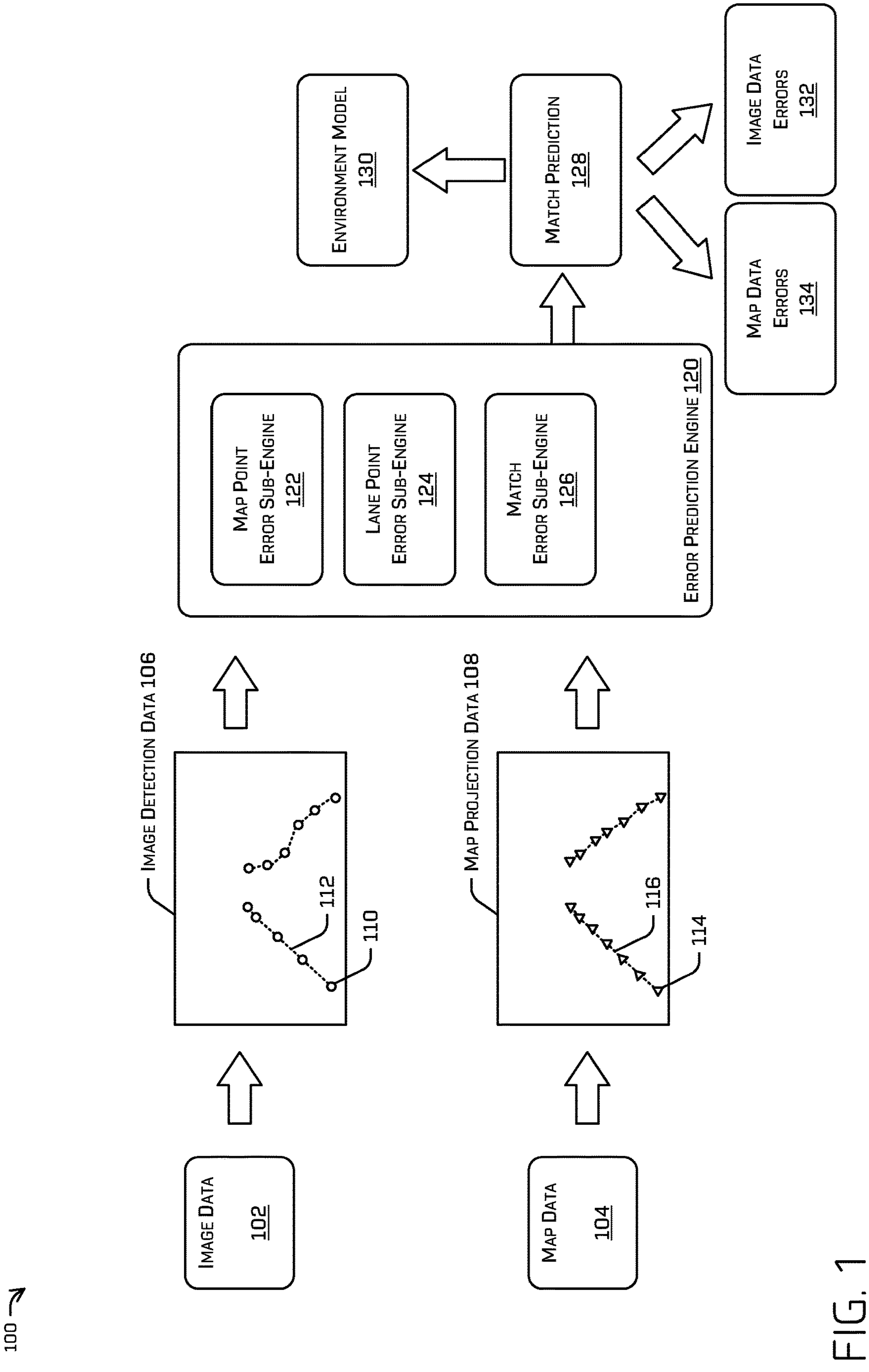
FIG. 1 provides an example of an architecture for determining a match prediction based on image data and map data associated with a vehicle environment.

Techniques for determining a match prediction associated with image data and map data associated with a vehicle environment are described herein. In some cases, the techniques described herein enable determining the match prediction based on: (i) an image segment that represents at least a portion of a lane marking (e.g., one contiguous lane marking segment, a sequence of two or more contiguous lane marking segments, and/or the like) as detected based on the image data and (ii) a map segment that represents at least a portion of a lane marking as determined based on the map data. In some cases, to determine the match prediction, an example system determines: (i) a set of first errors between map points associated with the map segment and the image segment, and (ii) a set of second errors between image points associated with the image segment and the map segment. In some cases, the match prediction associated with the image segment and the map segment may be used to determine the location of a lane marking and/or a lane within a vehicle environment. The determined location(s) may then be used to control the vehicle in a manner that increases the likelihood that the vehicle is operated in compliance with relevant traffic regulations and avoids collision with other objects in the vehicle environment. In some cases, the match prediction may be used to validate and update at least one of the image data or the map data associated with the vehicle environment. The updated environment data may then be used to control the vehicle in a manner that is configured to increase the likelihood that the vehicle is operated in compliance with relevant traffic regulations and avoids collision with other objects in the vehicle environment. Accordingly, the techniques discussed herein may improve the safety of occupants of an autonomous vehicle that incorporates the techniques discussed herein. Moreover, the techniques may improve the efficiency and reliability of a vehicle, such as an autonomous vehicle, in accomplishing a mission such as, for example, delivering passengers and/or cargo, surveying a region, or the like.

In some cases, in accordance with the techniques described herein, an example system determines an image segment of the image data that depicts at least a portion of a lane marking. The image segment may be defined by a set of image points (e.g., two image points), where each image point may represent a two-dimensional position within the image segment that is associated with depiction of a lane marking. For example, the image segment may be a line segment (e.g., a two-dimensional line segment) within the image data that passes through a first image point and a second image point. In addition to determining the image segment, the example system may determine a map segment associated with the vehicle environment by determining a location of a lane marking in a vehicle environment based on the map data. The map segment may thus be a segment of the three-dimensional model that corresponds to at least a portion of the three-dimensional model identified between two map coordinates associated with at least a portion of a lane marking. The map segment may be defined a set of map points (e.g., two map points), where each map point may represent a three-dimensional position within the three-dimensional model that is associated with map coordinates associated with at least a portion of a lane marking. For example, the map segment may be a line segment (e.g., a three-dimensional line segment) within the three-dimensional model that passes through a first map point and a second map point.

In some cases, after the example system determines the image segment and the map segment, the example system determines two sets of errors: (i) a set of first errors each associated with a respective map point and representing a measure of deviation of the locations of the respective map point and the image segment and (ii) a set of second measures each associated with a respective image point and representing a measure of deviation of the locations of the respective image point and the map segment. The two sets of errors may then be used to determine a match prediction associated with the image data and the map data. The match prediction may thus be determined based on a bidirectional error computation that integrates both the errors associated with the image points in the image data and the map segment, as well as the errors associated with map points determined based on the map data and the lane detected based on the image data. In some cases, if the image segment includes a first image point and a second image point and the map segment includes a first map point and a second map point, the match prediction associated with the image data and the map data may be determined based on at least one of: (i) an error associated with the first map point and the image segment, (ii) an error associated with the second map point and the image segment, (iii) an error associated with the first image point and the map segment, or (iv) an error associated with the second image point and the map segment.

In some cases, the techniques described herein include detecting a lane marking in the image data associated with the vehicle environment. In some cases, to detect a lane marking in the vehicle environment, an example system first receives image data associated with the vehicle environment via an image sensor associated with the vehicle. The image data associated with the vehicle environment may be captured by one or more image sensors (e.g., a visible light spectrum camera, an infrared camera, etc.) of the vehicle. In some cases, the image data includes monocular image data captured by a monocular camera without corresponding measured depth data.

In some cases, after receiving image data associated with the vehicle environment, the example system processes the image data to detect M lane markings in the vehicle environment. A detected lane marking may be defined by a set of (e.g., an ordered sequence of) detected image points. To detect a lane marking, the example system may use one or more computer vision techniques. Examples of such computer vision techniques include techniques that use one or more machine learning models, such as a convolutional neural network (CNN). In some cases, the output of processing the image data to detect a lane marking is an ordered list of K image points, where each image point is a point (e.g., a two-dimensional point) in the image data that is detected to represent at least a portion of the detected lane marking. For example, each image point may represent a point in the normalized image coordinates of a perfect pin-hole camera.

Although various operations are described with reference to determining match predictions based on map data and image data, a person of ordinary skill in the relevant technology will recognize that other types of sensor data (e.g., lidar data, radar data, ultrasonic sensor data, and/or the like) may be utilized in addition to and/or instead of image data. In some cases, the operations described herein as being performed based on and/or in relation to the image data may be performed based on and/or in relation to other sensor data in addition to and/or instead of image data. In general, various types of sensor data associated with an autonomous vehicle can be used in combination to provide a rich understanding of the vehicle's environment, including detection of a lane and/or a lane marking in the vehicle environment.

In some cases, the techniques described herein include determining an image segment (or other sensor data segment) in the image data that is determined to depict at least a portion of a detected lane marking. In some cases, the image segment represents a line segment in the image that passes through (e.g., is between) two image points, where each image point is a point in the image data that is detected to depict at least a portion of a lane marking. The line segment may be generated by detecting a pair of image points and determining a line (e.g., a shortest line) between the pair. The line segment may be generated by fitting a spline function based on the pair of image points.

In some cases, by processing the image data, the example system generates M ordered lists, where each ith ordered list $D_i$ represents the image points associated with an ith detected lane marking. In some cases, the ith ordered list is an ordered list of K image points ($C_{D_i,1}, \ldots, C_{i,K}$). In some cases, the ith ordered list represents K−1 image segments (e.g., K−1 line segments, such as K−1 two-dimensional line segments), where each image segment $L_{D_i,j}$ may correspond to a line segment in the image data that passes through two consecutive image points $C_{D_i,j}$ and $C_{D_i,j+1}$ in $D_i$ (as determined based on the ordering of $D_i$).

In some cases, an image segment $L_{D_i,j}$ that is defined by a first image point $C_{D_i,j}$ and a second image point $C_{D_i,j+1}$ is a line segment in the image data between the two image points, such that the two image points are endpoints of the line segment. In some cases, if an image segment $L_{D_i,1}$ that is defined by a first image point $C_{D_i,1}$ and a second image point $C_{D_i,2}$ is the initial image segment associated with the ith detected lane marking, then the image segment is a line segment with an endpoint $C_{D_i,2}$ that passes through $C_{D_i,1}$ but extends past $C_{D_i,1}$ (e.g., by a predefined amount, such as a predetermined amount that may be determined based on an estimated length of the ith lane marking). In some cases, if an image segment $L_{D_i,K-1}$ that is defined by a first image point $C_{D_i,K-1}$ and a second image point $C_{D_i,2}$ is the last image segment associated with the ith detected lane marking, then the image segment is a line segment with an endpoint $C_{D_i,K-1}$ that passes through $C_{D_i,K}$ but extends past $C_{D_i,K}$ (e.g., by a predefined amount, such as a predetermined amount that may be determined based on an estimated length of the ith lane marking). The purpose of this unidirectional extension may be to account for detection errors associated with endpoints of lane markings.

In some cases, the techniques described herein include determining a map segment based on map data associated with a vehicle environment. In some cases, the map data may represent one or more map coordinates (e.g., one or more two-dimensional map coordinates) associated with a lane marking in the vehicle environment. In some cases, to determine the map segment, the example system projects the map coordinate(s) associated with a lane marking into a three-dimensional model of the vehicle environment.

In some cases, the example system generates N ordered lists, where each ith ordered list $Z_i$ represents the map points associated with an ith lane marking. In some cases, the ith ordered list is an ordered list of K map points ($C_{Z_1,1}, \ldots, C_{Z_1,K'}$). In some cases, the ith ordered list represents K'−1 map segments, where each $L_{Z_i,j}$ may correspond to a line passing through two consecutive map points $C_{Z_i,j}$ and $C_{Z_i,j+1}$ associated with the ith lane marking (e.g., as defined by the ordering of $Z_i$).

In some cases, a map segment $L_{Z_i,j}$ that is defined by a first map point $C_{Z_i,j}$ and a second map point $C_{Z_i,j+1}$ is a line segment in the three-dimensional environment model between the two map points, such that the two map points are endpoints of the line segment. In some cases, if a map segment $L_{Z_i,1}$ that is defined by a first map point $C_{Z_i,1}$ and a second map point $C_{Z_i,2}$ is the initial map segment associated with the ith detected lane marking, then the map segment is a line segment with an endpoint $C_{Z_i,2}$ that passes through $C_{Z_i,1}$ but extends past $C_{Z_i,1}$ (e.g., by a predefined amount, such as a predetermined amount that may be determined based on an estimated length of the ith lane marking). In some cases, if a map segment $L_{D_i,K-1}$ that is defined by a first map point $C_{Z_i,K-1}$ and a second map point $C_{Z_i,2}$ is the last map segment associated with the ith detected lane marking, then the map segment is a line segment with an endpoint $C_{Z_i,K-1}$ that passes through $C_{Z_i,K}$ but extends past $C_{Z_i,K}$ (e.g., by a predefined amount, such as a predetermined amount that may be determined based on an estimated length of the ith lane marking). The purpose of this unidirectional extension may be to account for mapping errors associated with endpoints of lane markings.

In some cases, the techniques described herein include determining a first error associated with a map point in a map segment associated with a vehicle environment and an image segment of the image data that is determined to depict a lane marking. In some cases, the first error is determined based on at least one of the following: (i) a shortest distance between the map point and a plane associated with a first image point and a second image point of the image segment, (ii) whether a point resulting from the projection of the map point into the plane falls within the image segment, (iii) a shortest distance between a ray passing through the first image point and the map point, or (iv) a shortest distance between a ray passing through the second image point and the map point.

In some cases, to determine the first error associated with an image segment $L_{D_n,m}$ between a first image point $C_{D_n,m}$ associated with an nth lane and a second image point $C_{D_n,m+1}$ associated with the nth lane, the example system determines a plane spanned by $L_{D_n,m}$. The plane may be a three-dimensional plane in the three-dimensional model of the vehicle environment that is spanned by $L_{D_i,j}$ and may have a predefined center point (e.g., a point associated with a location of the camera used to capture the image data in the three-dimensional environment model). The example system may then project the map point into the plane and determine whether the projected point falls within $L_{D_n,m}$. In some cases, to project the map point onto the plane, the example system may perform one or more computational geometry operations to: (i) generate a line that connects the map point with a first point (e.g., a randomly-selected point) on the plane, (ii) determine the intersection point between the generated line and the plane, and (iii) adopt the intersection point as the projected point. Accordingly, in some cases, the resulting projected point may have the same x and y coordinates as the map point but a different z coordinate that corresponds to the distance between the map point and the plane.

In some cases, based on determining that the projection of the map point onto the plane spanned by the image segment $L_{D_n,m}$ falls within $L_{D_n,m}$, the example system: (i) determines that there is no longitudinal mismatch between $L_{D_n,m}$ and the map point, and (ii) determines the first error associated with $L_{D_n,m}$ and the map point based on a measure of distance (e.g., a shortest distance) between the map point and the plane. The example system may determine the measure of distance between the map point and the plane based on a measure of Euclidean distance between the projection of the map point onto the plane and the map point itself.

In some cases, based on determining that the projection of the map point onto the plane spanned by the image segment $L_{D_n,m}$ falls outside $L_{D_n,m}$, the example system: (i) determines that there is a longitudinal mismatch between $L_{D_n,m}$ and the map point, and (ii) determines the first error associated with $L_{D_n,m}$ and the map point based on the shorter of: (a) a shortest distance between a first ray originating at the camera origin and passing through the first image point $C_{D_n,m}$ and the map point, and (b) a shortest distance between a second ray originating at the camera origin and passing through the second image point $C_{D_n,m+1}$ and the map point. The first ray may be a three-dimensional ray in the three-dimensional model of the vehicle environment that passes through $C_{D_n,m}$ and a predefined position in the three-dimensional environment model (e.g., a predefined position associated with the location of a camera used to capture the image data). The second ray may be a three-dimensional ray in the three-dimensional model that passes through $C_{D_n,m+1}$ and a predefined position in the three-dimensional model (e.g., a predefined position associated with the location of a camera used to capture the image data).

In some cases, to determine the first error associated with the map point $C_{Z_i,j}$ and the image segment $L_{D_n,m}$ that is associated with the first image point $C_{D_n,m}$ and the second image point $C_{D_n,m+1}$, the example system performs the operations associated with Equation 1 depicted below:

Equation 1

$$M_Z^*(C_{Z_i,j}, L_{D_n,m}) = \begin{cases} f_{XP}(C_{D_i,j}, L_{D_n,m}), & \text{if projection of } C_{D_i,j} \text{ onto the plane spanned by } L_{D_n,m} \text{ falls within } L_{D_n,m} \\ \min\{f_{LX}(C_{D_n,m}, C_{Z_i,j}), (C_{D_n,m+1}, C_{Z_i,j})\}, & \text{otherwise} \end{cases}$$

In Equation 1: (i) $M^*_Z(C_{Z_i,j}, L_{D_n,m})$ is the first error associated with the map point $C_{Z_i,j}$ and the image segment $L_{D_n,m}$, (ii) $f_{XP}(a, b)$ is a function that returns the shortest distance between a point a (e.g., a three-dimensional point) and a plane spanned by the image segment b (e.g., a three-dimensional plane), and (iii) $f_{LX}(c, d)$ is a function that returns the shortest distance between a line defined by a ray passing through c (e.g., a three-dimensional line) and a point d (e.g., a three-dimensional point). In some cases, $f_{XP}(C_{Z_i,j}, L_{D_n,m})$ is determined based on the equation $$f_{XP}(C_{Z_i,j}, L_{D_n,m}) = \left| \frac{C_{D_n,m} \times C_{D_n,m+1}}{\|C_{D_n,m} \times C_{D_n,m+1}\|_2} \cdot C_{Z_i,j} \right|.$$

In some cases, the techniques described herein include determining a second error associated with an image point in an image segment associated with a vehicle environment and map segment in the three-dimensional environment model that is determined to depict a lane marking. In some cases, the second error is determined based on at least one of: (i) a shortest distance between: (a) a line defined by a ray passing through the image point and (b) the map segment, (ii) whether a point of contact of the line is within the map segment (e.g., whether the line intersects with the map segment), (iii) a shortest distance from the ray to a first map point associated with the map segment, or (iv) a shortest distance from the ray to a second map point associated with the map segment.

In some cases, to determine the second error associated with an image point $C_{D_i,j}$ and a map segment $L_{Z_n,m}$ that includes a first map point $C_{Z_n,m}$ and a second map point $C_{Z_n,m+1}$, the example system determines a ray (e.g., a three-dimensional ray in the three-dimensional environment model) that passes through $C_{D_i,j}$. For example, the ray may pass through $C_{D_i,j}$ and a predefined point in the three-dimensional model (e.g., a point associated with a location of the camera used to capture the image data). In some cases, the example system additionally determines a line that extends along the ray in both directions. In some cases, after determining the line, the example system determines whether a point of contact of the line is within the map segment (e.g., whether the line intersects with the map segment). In some cases, based on determining that a point of contact of the line is within the map segment (e.g., that the line intersects with the map segment), the example system: (i) determines that there is no longitudinal mismatch between $C_{D_i,j}$ and $L_{Z_n,m}$, and (ii) determines the second error based on the shortest distance between the line and the map segment $L_{Z_n,m}$. In some cases, based on determining that a point of contact of the line is outside of the map segment (e.g., that the line does not intersect with the map segment), the example system: (i) determines that there is a longitudinal mismatch between $C_{D_i,j}$ and $L_{Z_n,m}$, and (ii) determines the second error based on the lesser of: (i) a shortest distance from the ray that passes through $C_{D_i,j}$ to the first map point $C_{Z_n,m}$, or (ii) a shortest distance from the ray that passes through $C_{D_i,j}$ to the second map point $C_{Z_n,m+1}$.

In some cases, to determine the second error associated with an image point $C_{D_i,j}$ and a map segment $L_{Z_n,m}$ that includes a first map point $C_{Z_n,m}$ and a second map point $C_{Z_n,m+1}$, the example system performs operations associated with Equation 2 provided below:

Equation 2

$$M_D^*(C_{D_i,j}, L_{Z_n,m}) = \begin{cases} f_{LL}(C_{D_i,j}, L_{Z_n,m}), & \text{if a point of contact of a line that passes through } C_{D_i,j} \text{ is within } L_{Z_n,m} \\ \min\{f_{LX}(C_{D_i,j}, C_{Z_n,m}), (C_{D_i,j}, C_{Z_n,m+1})\}, & \text{otherwise} \end{cases}$$

In Equation (2): (i) $M^*_D(C_{D_i,j}, L_{Z_n,m})$ is the second error associated with the image point $C_{D_i,j}$ and the map segment $L_{Z_n,m}$, (ii) $f_{LL}(a, b)$ is a function that returns a shortest distance between a line (e.g., a three-dimensional line) associated with a ray that passes through a and a line b, and (iii) $f_{LX}(c, d)$ is a function that returns the shortest distance between a line (e.g., a three-dimensional line) defined by a ray passing through c and a point d (e.g., a three-dimensional point).

In some cases, the techniques described herein include determining a match error associated with a map point determined based on the map data for the vehicle environment. In some cases, the example system determines a match error for each map point determined based on the map data. In some cases, the match error associated with a map point $C_{Z_i,j}$ represents at least one of: (i) whether $C_{Z_i,j}$ matches any of the image segments detected based on the image data for the vehicle environment, or (ii) the minimum value among all of the first errors associated with $C_{Z_i,j}$ (e.g., among the set $\{(M^*_Z(C_{Z_i,j}, L_{D_n,m}))\forall n, m\}$). In some cases, the match error associated with a map point $C_{Z_i,j}$ is determined based on all of the first errors associated with $C_{Z_i,j}$ (e.g., based on the set $\{(M^*_Z(C_{Z_i,j}, L_{D_n,m}))\forall n, m\}$). In some cases, the example system determines that a map point $C_{Z_i,j}$ matches an image segment $L_{D_n,m}$ if the first error associated with $C_{Z_i,j}$ and $L_{D_n,m}$ is lower than a threshold and/or if the $C_{Z_i,j}$ does not have a longitudinal mismatch with respect to all of the image segments determined based on the image data associated with the corresponding vehicle environment.

In some cases, to determine the match error associated with a map point $C_{Z_i,j}$, the example system first determines whether the map point matches any of the image segments detected based on the image data for the corresponding vehicle environment. In some cases, based on determining that $C_{Z_i,j}$ matches at least one of the image segments, the example system determines the match error associated with $C_{Z_i,j}$ based on the minimum value among all of the first errors associated with $C_{Z_i,j}$ (e.g., among the set $\{(M^*_Z(C_{Z_i,j}, L_{D_n,m}))\forall n, m\}$). In some cases, based on determining that $C_{Z_i,j}$ does not match any of the image segments, the example system determines the match error associated with $C_{Z_i,j}$ based on a predefined value (e.g., a predefined high value, such as a value of positive infinity).

In some cases, the example system determines the match error associated with a map point $C_{Z_i,j}$ by performing operations associated with Equation 3 depicted below:

$$M_Z(C_{Z_i,j}) = \min(\infty, \{(M_Z^*(C_{Z_i,j}, L_{D_n,m}))\forall n, m\}) \qquad \text{Equation 3}$$

In Equation 3: (i) $M_Z(C_{Z_i,j})$ is the match error associated with $C_{Z_i,j}$, and (ii) $M^*_Z(a, b)$ is a function that returns the first error associated with the map point a and the image segment b.

In some cases, the techniques described herein include determining a match error associated with an image point detected based on the image data for the vehicle environment. In some cases, the example system determines a match error for each image point detected based on the image data. In some cases, the match error associated with an image point $C_{D_i,j}$ represents at least one of: (i) whether $C_{D_i,j}$ matches any of the map segments determined based on the map data for the vehicle environment, or (ii) the minimum value among all of the second errors associated with $C_{D_i,j}$ (e.g., among the set $\{(M^*_D(C_{D_i,j}, L_{Z_n,m}))\forall n, m\}$). In some cases, the match error associated with an image point $C_{D_n,m}$ is determined based on all of the second errors associated with $C_{D_i,j}$ (e.g., based on the set $\{(M^*_D(C_{D_i,j}, L_{Z_n,m}))\forall n, m\}$). In some cases, the example system determines that an image point $C_{D_n,m}$ matches a map segment $L_{Z_n,m}$ if the second error associated with $C_{Z_i,j}$ $L_{D_n,m}$ is lower than a threshold and/or if the $C_{D_n,m}$ does not have a longitudinal mismatch with respect to all of the map segments determined based on the map data associated with the vehicle environment.

In some cases, to determine the match error associated with an image point $C_{D,j}$, the example system first determines whether the image point matches any of the map segments determined based on the map data associated with the corresponding vehicle environment. In some cases, based on determining that $C_{D,j}$ matches at least one of the map segments, the example system determines the match error associated with $C_{D,j}$ based on the minimum value among all of the first errors associated with $C_{D,j}$ (e.g., among the set $\{(M^*_D(C_{D_i,j}, L_{Z_n,m}))\forall n, m\}$). In some cases, based on determining that $C_{D,j}$ does not match any of the map segments, the example system determines the match error associated with $C_{D,j}$ based on a predefined value (e.g., a predefined high value, such as a value of positive infinity).

In some cases, the example system determines the match error associated with an image point $C_{D,j}$ by performing operations associated with Equation 4 depicted below:

$$M_D(C_{D_i,j}) = \min(\infty, \{(M_D^*(C_{D_i,j}, L_{Z_n,m}))\forall n, m\}) \qquad \text{Equation 4}$$

In Equation 4: (i) $M_Z(C_{Z_i,j})$ is the match error associated with $C_{D,j}$, and (ii) $M^*_D(a, b)$ is a function that returns the second error associated with the image point a and the map segment b.

In some cases, the techniques described herein include determining a match prediction associated with the image data and the map data. In some cases, the match prediction may represent, for an image point associated with the image data, a match error associated with the image point. In some cases, the match prediction may represent, for each image point associated with the image data, a match error associated with the image point. In some cases, the match prediction may represent, for a map point associated with the map data, a match error associated with the map point. In some cases, the match prediction may represent, for each map point associated with the map data, a match error associated with the map point. In some cases, the match prediction may represent, for a control point associated with the vehicle environment, a match error associated with the control point. In some cases, the match prediction may represent, for each control point associated with the vehicle environment, a match error associated with the control point. The set of control points associated with the vehicle environment may include at least one of: (i) at least one image point (e.g., all of the image points) associated with the image data for the vehicle environment, or (ii) at least one map point (e.g., all of the map points) associated with the map data for the vehicle environment.

In some cases, the match prediction includes $E(Z, D)=(E(D \rightarrow Z), E(Z \rightarrow D))$, where $E(D \rightarrow Z)$ may represent the set of match errors associated with the image points detected based on the image data of the vehicle environment, and $E(Z \rightarrow D)$ may represent the set of match errors associated with the map points determined based on the map data of the vehicle environment. In some cases, $E(D \rightarrow Z)$ is determined based on $E(D \rightarrow Z)=\{(M_D(C_{D_i,j}))\forall i, j\}$, where $M_D(a)$ may be a function that returns the match error associated with the image point a. In some cases, $E(Z \rightarrow D)$ is determined based on $E(Z \rightarrow D)=\{(M_Z(C_{Z_n,m}))\forall n, m\}$, where $M_Z(b)$ may be a function that returns the match error associated with the map point b.

In some cases, the match prediction includes a determination about whether a control point (e.g., an image point and/or a map point) associated with the vehicle environment is associated with a longitudinal mismatch. In some cases, the match prediction includes a determination about whether an image point associated with the vehicle environment does not match with any map segments. In some cases, the match prediction includes a determination about whether a map point associated with the vehicle environment does not match with any image segments. In some cases, the match prediction includes a prediction about whether at least one map point of a map segment matches with any image segments. In some cases, the match prediction includes a prediction about whether at least one image point of an image segment matches with any map segments.

In some cases, the techniques described herein include controlling a vehicle based on the match prediction. In some cases, controlling the vehicle includes determining a location of a lane marking in a vehicle location based on the match prediction, determining a recommended trajectory for the vehicle based on the determined location, and controlling the vehicle based on the recommended trajectory. In some cases, controlling the vehicle includes determining that the map data associated with the vehicle environment includes erroneous data (e.g., a map point with a longitudinal mismatch, a map point that does not match with any image segments detected based on the corresponding image data, and/or the like), updating the map data based on the erroneous data, determining a recommended trajectory for the vehicle based on the updated map data, and controlling the vehicle based on the recommended trajectory. In some cases, controlling the vehicle includes determining that image data associated with the vehicle environment includes erroneous data (e.g., an image point with a longitudinal mismatch, an image point that does not match with any map segments detected based on the corresponding map data, and/or the like), updating the image data based on the erroneous data, determining a recommended trajectory for the vehicle based on the updated image data, and controlling the vehicle based on the recommended trajectory.

In some cases, the techniques discussed herein can be implemented to facilitate and/or enhance safety of automated navigation features in vehicles, such as in automated vehicles or semi-automated vehicles. For example, the techniques can be used to determine a trajectory for an autonomous vehicle and control the autonomous vehicle based on the trajectory. As another example, the techniques can be used to determine that a current trajectory of a vehicle is likely to violate one or more constraint conditions associated with a detected lane in the vehicle environment. Upon determining that the current trajectory is likely to violate one or more constraint conditions, the driver of the vehicle may be stopped from following the current trajectory and/or may be alerted about the likelihood of constraint violation. In some cases, upon determining that the current trajectory of an autonomous vehicle is likely to violate one or more constraint conditions associated with a detected lane in the autonomous vehicle environment, the driver of the autonomous vehicle may be alerted to exercise manual control of the autonomous vehicle.

In some cases, the techniques described herein can be implemented to improve lane detection by a vehicle by using lane data provided by the image data, lane data provided by the map data (e.g., by projection of map data about lane marking locations into a three-dimensional model of the vehicle environment), and one or more match predictions that represent one or more correlations based on the image-based lane data and the map-based lane data. The correlated use of both image and map data in determining the match prediction allows the system to compensate for the limitations and inaccuracies of either source of data. This can additionally reduce the amount of computation required to process data, resulting in improved computational efficiency. In some cases, the techniques described enable the matching of image data with map data, which can lead to improved accuracy in determining the location of lane markings and lanes within a vehicle environment. The use of both image and map data can compensate for limitations and inaccuracies in either source of data, resulting in more precise location estimates.

In some cases, the techniques described herein can reduce data transfer requirements and improve robustness of autonomous navigation using a distributed system. In some cases, validation and updating of image and map data associated with the vehicle environment can reduce the amount of data that needs to be transferred between the vehicle and a central server or cloud-based system. For example, if an autonomous vehicle is traveling through a city and its sensors detect a lane marking that is not present in the map data stored on the vehicle, an example system can use the techniques described herein to determine a match prediction between the image data and the map data. If the match prediction indicates that the lane marking is indeed new and not present in the map data, the system can update the map data with the new information. By updating the map data on the vehicle itself, the system can avoid transferring the large image data associated with the newly detected lane marking to a central server or cloud-based system. Instead, only the updated map data needs to be transferred, which can be significantly smaller in size than the image data. This can reduce the amount of data that needs to be transmitted over a network connection and improve the computational and storage efficiency of the system. Furthermore, by updating the map data on the vehicle itself, the system can avoid relying on a central server or cloud-based system for map data updates. This can improve the robustness and reliability of the autonomous vehicle system, as it can continue to operate even in areas with limited network connectivity that hamper communications with the central server or cloud-based system.

The methods, apparatuses, and systems described herein can be implemented in a number of ways. Example implementations are provided below with reference to the following figures. Although discussed in the context of a vehicle, the methods, apparatuses, and systems described herein can be applied to a variety of prediction systems and are not limited to vehicles. Further, although various operations for determining a match prediction are described as being performed by a vehicle computing device, a person of ordinary skill in the relevant technology will recognize that the prediction component may be deployed on other computing devices, such as on a remote computing device that communicates with a vehicle computing device using a networked connection. Moreover, although various operations are described with reference to determining match predictions based on map data and image data, a person of ordinary skill in the relevant technology will recognize that other types of sensor data (e.g., lidar data, radar data, ultrasonic sensor data, and/or the like) may be utilized in addition to and/or instead of image data. Additionally, although various operations are in relation to detecting and/or determining a lane marking based on image data and/or map data, a person of ordinary skill in the relevant technology will recognize that all of those operations can be performed in relation to detecting and/or determining a sequence of lane markings based on image data and/or map data.

FIG. 1 provides an example of an architecture 100 for determining a match prediction 128 based on image data 102 and map data 104 associated with a vehicle environment. The match prediction 128 may represent one or more predictions about correlations and/or matches across lane data detected based on the image data 102 and lane data determined based on the map data 104.

Image data 102 can represent any type of image data captured using an image sensor. For example, the image data 102 can represent color intensity values associated with various locations within a region of the vehicle environment that is observed by the image sensor. The color intensity values may be associated with a color encoding scheme, such as the RGB scheme. Accordingly, in some cases, the image data 102 can represent RGB (red-green-blue) data captured by one or more image sensors installed on an autonomous vehicle. In some instances, the image data 102 can include any number of images at any frame rate. The image data 102 may be two-dimensional.

Map data 104 may represent one or more map objects. A map object may represent the location of a static environment feature (e.g., a lane marking, a traffic light, a road sign, a crosswalk, a stop line, and/or the like) as expressed in accordance with the coordinate system of the map data 104. In some cases, a map object corresponds to a roadway object type that includes one or more of a lane marking, a traffic light, a road sign, a crosswalk marking, or a stop line. Accordingly, map data 104 may represent relative locations of one or more static environment features. In some cases, at least a portion of the map data 104 is retrieved from a locally stored map database. In some cases, at least a portion of the map data is received by querying a remotely stored map database. In some cases, the map data 104 is generated by updating a locally stored map database based on updates received from a remotely-stored map database. The map data 104 may be two-dimensional or three-dimensional.

As depicted in FIG. 1, image data 102 is processed to generate image detection data 106. For example, the image data 102 may be processed by a machine learning model (e.g., a convolutional neural network) to determine the image detection data 106. The image detection data 106 may include M lane markings detected based on the image data 102, where each detected lane marking may be defined by an ordered sequence of image points. An image point (e.g., the image point 110) may be a position within the image data that is detected to depict a portion of a lane marking. In some cases, if a detected lane marking is defined by K image points, then the image detection data 106 associates the lane marking with K/image segments, each image segment (e.g., the image segment 112) being defined by two image points (which may be consecutive as defined by the ordering of the corresponding sequence of image points). In some cases, an image segment may be a line segment in the image data 102 that passes through two consecutive image points.

As further depicted in FIG. 1, map data 104 is processed to generate map projection data 108. In some cases, the map projection data 108 may include N lane markings determined based on the map data 104, where each ith detected lane marking may be defined by an ordered sequence of map points. A map point (e.g., the map point 114) may be a position within the three-dimensional environment model that contains a portion of a lane marking. In some cases, if a detected lane marking is defined by K' map points, then the map projection data 108 associates the lane marking with K'−1 map segments, each map segment (e.g., the map segment 116) being defined by two consecutive map points as defined by the ordering of the corresponding sequence of map points. In some cases, a map segment may be a line segment in the three-dimensional environment model that passes through two consecutive map points.

As further depicted in FIG. 1, the image detection data 106 and the map projection data 108 are processed by an error prediction engine 120 to determine a match prediction 128. In some cases, the error prediction engine 120 determines at least one of the following based on the image detection data 106 and the map projection data 108: (i) for each map point detected based on the map data 104, a set of M first errors associated with the respective map point across the M image segment determined based on the image data 102, (ii) for each image point detected based on the image data 102, a set of N second error associated with the respective image point across the N map segments determined based on the map data 104, (iii) for each map point detected based on the map data 104, a match error based on the M first errors associated with the respective map point, or (iv) for each image point detected based on the image data 102, a match error based on the N second errors associated with the respective image point. In some cases, determining separate errors for map points and image points may be necessary because correlations between map points and image points are unknown.

In some cases, the error prediction engine 120 includes the map point error sub-engine 122. The map point error sub-engine 122 may be configured to determine, for each map point detected based on the map data 104, a set of M first errors associated with the respective map point across the M image segment determined based on the image data 102. In some cases, to determine the first error associated with a map point and an image segment that includes a first image point and a second image point, the map point error sub-engine 122 first determines a plane spanned by the image segment (e.g., a planned in the three-dimensional environment model that is centered at a camera location in the three-dimensional environment model). The map point error sub-engine 122 may then project the map point onto the plane and determine whether the projected map point falls within the image segment. If the projected map point falls within the image segment, the map point error sub-engine 122: (i) determines that there is no longitudinal mismatch between the image segment and the map point, and/or (ii) determines the first error associated with the image segment and the map point based on a measure of distance (e.g., a shortest distance) between the map point and the plane. If the projected map point falls outside the image segment, the map point error sub-engine 122: (i) (determines that there is a longitudinal mismatch between the image segment and the map point, and (ii) determines the first error associated with the image segment and the map point based on the shorter of: (a) a shortest distance between a first ray passing through the first image point of the image segment and the map point, and (b) a shortest distance between a second ray passing through the second image point of the image segment and the map point.

In some cases, the error prediction engine 120 includes the image point error sub-engine 124. The image point error sub-engine 124 may be configured to determine, for each image point detected based on the image data 102, a set of N second error associated with the respective image point across the N map segments determined based on the map data 104. In some cases, to determine the second error associated with an image point and a map segment, the image point error sub-engine 124 determines a ray that passes through the image point (e.g., a ray in the three-dimensional environment model that passes through the image point and the camera location) and determines a line associated with the determined ray (e.g., a line that extends along the determined ray in both directions). In some cases, the image point error sub-engine 124 determines whether a point of contact of the line is within the map segment (e.g., whether the line intersects with the map segment). In some cases, if a point of contact of the line is within the map segment, the image point error sub-engine 124: (i) determines that there is no longitudinal mismatch between the image point and the map segment, and (ii) determines the second error associated with the image point and the map segment based on the shortest distance between the determined line and the map segment. In some cases, if no point of contact of the line is within the map segment, the image point error sub-engine 124: (i) determines that there is a longitudinal mismatch between the image point and the map segment, and (ii) determines the second error associated with the image point and the map segment based on the lesser of: (i) a shortest distance from the ray that passes through the image point to the first map point of the map segment, or (ii) a shortest distance from the ray that passes through the image point to the second map point of the map segment. Exemplary techniques for determining first errors associated with map points and image segments are described below in FIGS. 2-3 and 6.

In some cases, the error prediction engine 120 includes the match error sub-engine 126. The match error sub-engine 126 may be configured to: (i) for each map point detected based on the map data 104, determine a match error based on the M first errors associated with the respective map point, or (ii) for each image point detected based on the image data 102, determine a match error based on the N second errors associated with the respective image point. In some cases, to determine the match error associated with a map point, the match error sub-engine 126 determines whether the map point matches any of the image segments detected based on the image data 102. If the map point matches at least one of the image segments, the match error sub-engine 126 determines the match error associated with the map point based on the minimum value among all of the first errors associated with the map point. If the map point does not match any of the image segments, the match error sub-engine 126 determines the match error associated with the map point based on a predefined value (e.g., a predefined high value, such as a value of positive infinity). In some cases, to determine the match error associated with an image point, the match error sub-engine 126 determines whether the image point matches any of the map segments determined based on the map data 104. If the image point matches at least one of the map segments, the match error sub-engine 126 determines the match error associated with the image point based on the minimum value among all of the first errors associated with the image point. If the image point does not match any of the map segments, the match error sub-engine 126 determines the match error associated with the image point based on a predefined value (e.g., a predefined high value, such as a value of positive infinity). Exemplary techniques for determining second errors associated with image points and map segments are described below in FIGS. 4-5 and 7.

In some cases, the match prediction 128 may represent, for each map point detected based on the image data 102, the respective match error associated with the image point, as determined by the match error sub-engine 126 based on the second errors determined by the map point error sub-engine 122. In some cases, the match prediction 128 may represent, for each image point detected based on the image data 102, the respective match error associated with the image point, as determined by the match error sub-engine 126 based on the second errors determined by the image point error sub-engine 124.

As further depicted in FIG. 1, the match prediction 128 can be used to determine a vehicle environment model 130. In some cases, the match prediction 128 can be used to determine the location of a lane marking and/or a lane within a vehicle environment, as represented by the vehicle environment model 130. In some cases, to determine the vehicle environment model 130, an example system can use the match prediction 128 to locate and identify a lane marking and/or a lane within the vehicle environment. Then, the system can generate a three-dimensional model of the vehicle environment using a set of points in space, where each point corresponds to a location of the lane marking and/or the lane in the vehicle environment. The three-dimensional model can be augmented using data from multiple sensors, such as at least one of a lidar sensor, a camera, a radar sensor, and/or the like.

As further depicted in FIG. 1, the match prediction 128 can be used to determine one or more image data errors 132 and/or one or more map data errors 134. In some cases, the match prediction 128 can be used to validate and update at least one of the image data 102 or the map data 104. For example, in some cases, if the match prediction 128 represents that an image point detected based on the image data 102 does not match with any map segments determined based on the map data 104, an example system may determine that the image data used to detect the image point is erroneous. As another example, in some cases, if the match prediction 128 represents that a map point determined based on the map data 104 does not match with any image segments detected based on the image data 102, an example system may determine that the map data used to detect the map point is erroneous. As a further example, in some cases, if the match prediction 128 represents that an image point detected based on the image data 102 has longitudinal mismatches with all map segments determined based on the map data 104, an example system may determine that the image data used to detect the image point is erroneous. As another example, in some cases, if the match prediction 128 represents that a map point determined based on the map data 104 has longitudinal mismatches with all image segments detected based on the image data 102, an example system may determine that the map data used to detect the map point is erroneous.

Figure 2:
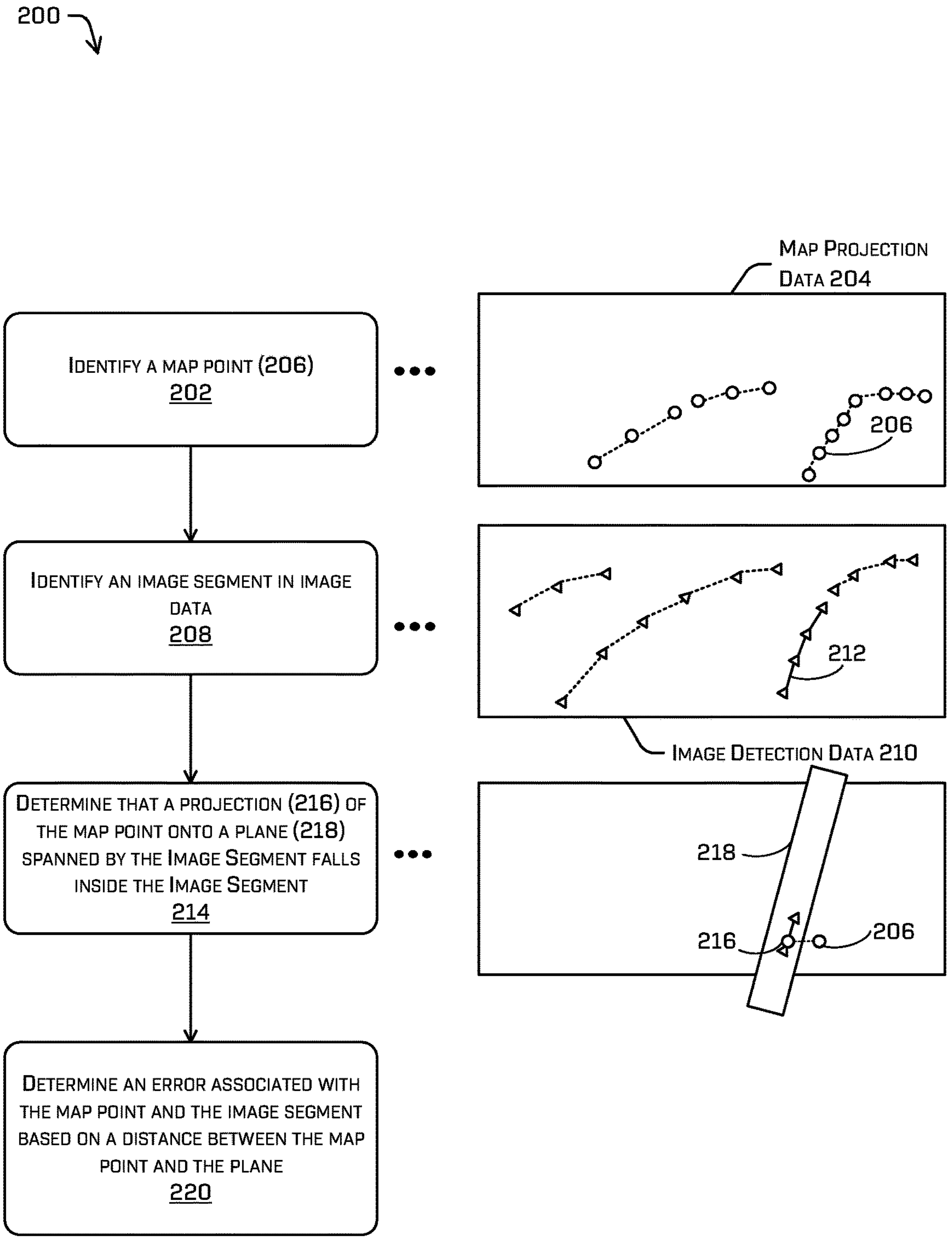
FIG. 2 is a flowchart diagram of an example process for determining a first error associated with a map point and an image segment when there is no longitudinal mismatch between the map point and the image segment.

FIG. 2 is a flowchart diagram of an example process 200 for determining a first error associated with a map point 206 and an image segment 212 when there is no longitudinal mismatch between the map point 206 and the image segment 212. As depicted in FIG. 2, at operation 202, the process 200 includes identifying (e.g., receiving and/or determining) the map point 206 in the map projection data 204. The map point 206 may represent a point in the three-dimensional environment model that is determined to be a projection of a map coordinate associated with a lane marking.

At operation 208, the process 200 includes identifying the image segment 212 in the image detection data 210. The image detection data 210 may be generated by detecting (e.g., using a machine learning model) one or more lane markings (in this example, three lane markings) in the image data associated with the environment. The image segment 212 may be a line segment that passes through two consecutive image points, where the two consecutive image points may be the endpoints of the line segment.

At operation 214, the process 200 includes determining that a projection 216 of the map point 206 onto a plane 218 spanned by the image segment 212 falls inside the image segment 212. As depicted in FIG. 2, the plane 218 spans the image segment 212. The plane 218 may be centered at a camera location within the environment model. After determining the plane 218, the map point 206 is projected onto the plane 218 to determine the projection 216, which falls within the image segment 212. In some cases, at operation 214, the process 200 includes determining that the map point 206 has no longitudinal mismatch in relation to the image segment 212 because the projection 216 falls within the image segment 212.

At operation 220, the process 200 includes determining the first error associated with the map point 206 and the image segment 212 based on a shortest distance between the map point 206 and the plane 218. In some cases, the map point 206 is a three-dimensional point, while the plane 21 is a three-dimensional plane.

FIG. 3 is a flowchart diagram of an example process 300 for determining a first error associated with a map point 206 and an image segment 312 when there is a longitudinal mismatch between the map point 306 and the image segment 312. As depicted in FIG. 3, at operation 302, the process 300 includes identifying (e.g., receiving and/or determining) the map point 306 in the map projection data 304. The map point 306 may represent a point in the three-dimensional environment model that is determined to be a projection of a map coordinate associated with a lane marking.

At operation 308, the process 300 includes identifying the image segment 312 in the image detection data 310. The image detection data 310 may be generated by detecting one or more lane markings in the image data associated with the environment. The image segment 312 may be a line segment that passes through two consecutive image points, where the two consecutive image points may be the endpoints of the line segment.

At operation 314, the process 300 includes determining that a projection 316 of the map point 306 onto a plane 318 spanned by the image segment 312 falls outside the image segment 312. As depicted in FIG. 3, the plane 318 (e.g., a planned centered at a camera location within the environment model) spans the image segment 312. After determining the plane 318, the map point 306 is projected onto the plane 318 to determine the projection 316, which falls outside the image segment 312. In some cases, at operation 314, the process 300 includes determining that the map point has a longitudinal mismatch in relation to the image segment 312 because the projection 316 falls outside the image segment 312.

At operation 320, the process 300 includes determining the first error associated with the map point 306 and the image segment 312 based on the shortest distance between: (i) the map point 306, and (ii) a ray that passes through the image point of the image segment 312 that is closer to the map point 306 (in this example, the lower image point). In some cases, the ray passes through and/or begins at a predefined location within the environment model, such as at a camera location within the environment model.

Figure 4:
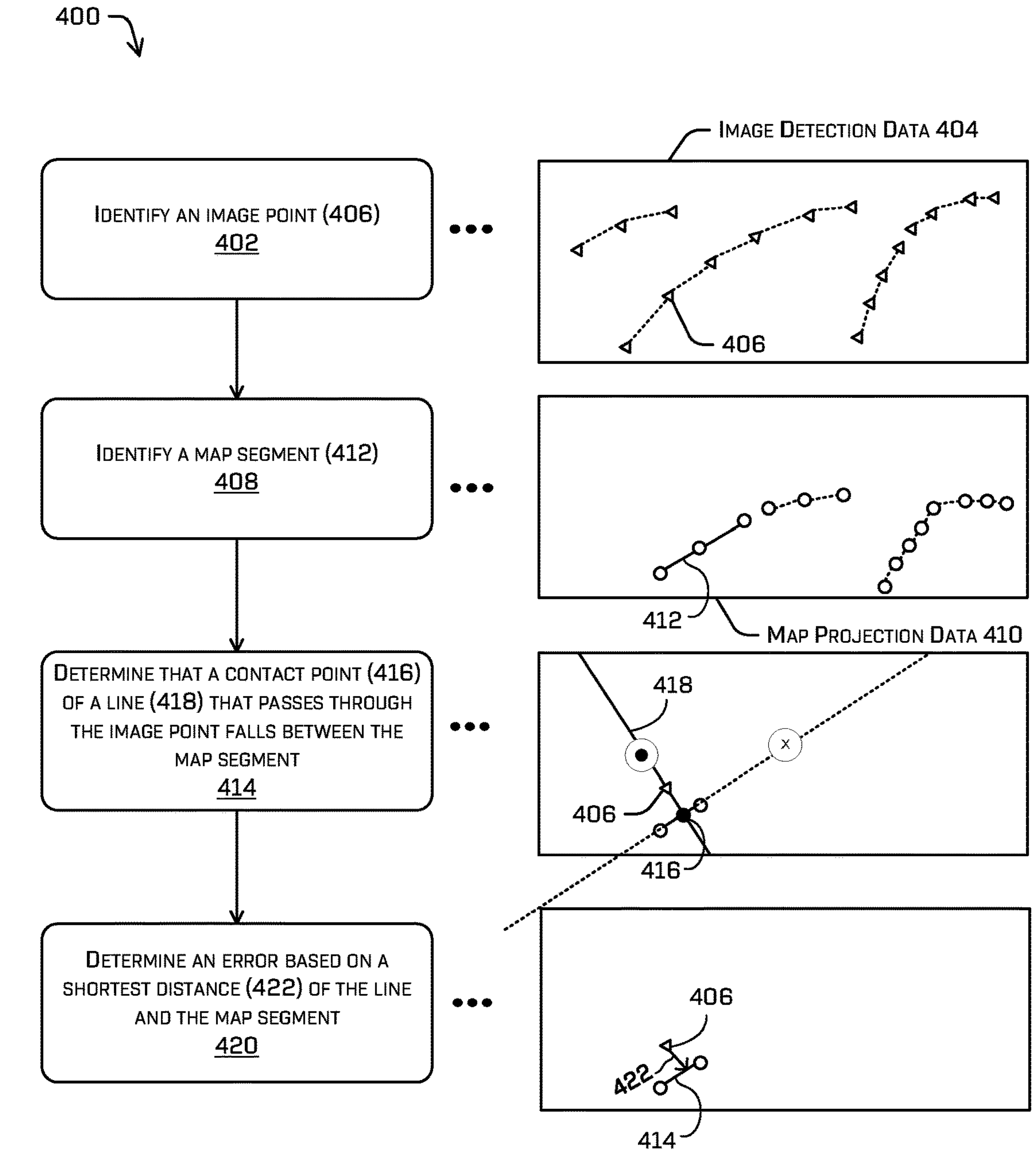
FIG. 4 is a flowchart diagram of an example process for determining a second error associated with an image point and a map segment when there is no longitudinal mismatch between the image point and the map segment.

FIG. 4 is a flowchart diagram of an example process 400 for determining a second error associated with an image point 406 and a map segment 412 when there is no longitudinal mismatch between the image point 406 and the map segment 412. As depicted in FIG. 4, at operation 402, the process 400 includes identifying the image point 406 in the image detection data 404. The image point 406 may be a point in the image data (e.g., two-dimensional image data) associated with the vehicle environment that is detected (e.g., using a machine learning model and by processing the image data) to depict at least a portion of a lane marking.

At operation 408, the process 400 includes identifying the map segment 412 based on the map projection data 410. The map segment 412 may be defined by two consecutive map points in the environment model. For example, the map segment 412 may be a line segment defined by two consecutive map points, such as a line segments whose endpoints are the two consecutive map points.

At operation 414, the process 400 includes determining that a contact point 416 of a line 418 that passes through the image point 406 with a ray that extends along the map segment 412 falls between the map segment 412. The line 418 may be associated with a ray that passes through the image point 406. For example, the line 418 may be the line (e.g., in the three-dimensional environment model) that is extended in both directions along the ray that passes through the image point 406. In some cases, the contact point 416 is the contact point 416 of the line 418 and a second line that extends along the map segment 412. In some cases, if the contact point 416 of the line 418 and the second line that extends along the map segment 412 falls within the map segment 412, then the line 418 has a contact point 416 that falls within the map segment 412. In some cases, at operation 414, the process 400 includes determining that the image point 406 has no longitudinal mismatch with respect to the map segment 412 because the contact point 416 falls within the map segment 412.

At operation 420, the process 400 includes determining a second error associated with the image point 406 and the map segment 412 based on a shortest distance 422 from the line 418 and the map segment 412. In some cases, the shortest distance 422 is determined using a function that returns a distance between two lines in a three-dimensional space and based on the line 418 and a second line that extends along the map segment 412.

Figure 5:
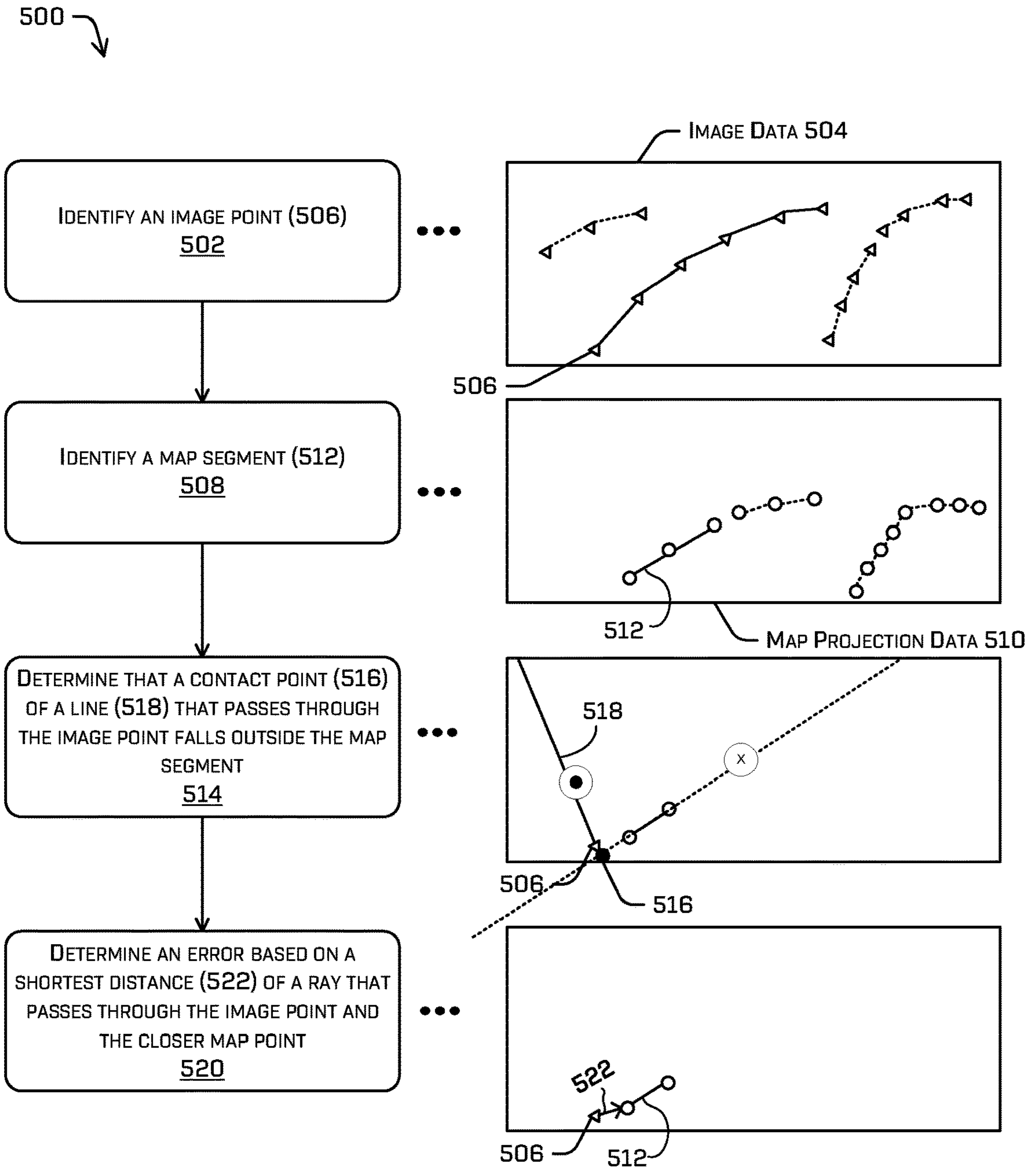
FIG. 5 is a flowchart diagram of an example process for determining a second error associated with an image point and a map segment when there is a longitudinal mismatch between the image point and the map segment.

FIG. 5 is a flowchart diagram of an example process 500 for determining a second error associated with an image point 506 and a map segment 512 when there is a longitudinal mismatch between the image point 506 and the map segment 512. As depicted in FIG. 5, at operation 502, the process 500 includes identifying the image point 506 in the image detection data 504. The image point 506 may be a point in the image data associated with the vehicle environment that is detected to depict at least a portion of a lane marking.

At operation 508, the process 500 includes identifying the map segment 512 based on the map projection data 510. The map segment 512 may be defined by two consecutive map points in the environment model.

At operation 514, the process 500 includes determining that a contact point of a line 518 that passes through the image point 506 with a ray that extends along the map segment falls outside the map segment 512. The line 518 may be associated with a ray that passes through the image point 506. For example, the line 518 may be the line (e.g., in the three-dimensional environment model) that is extended in both directions along the ray that passes through the image point 506. In some cases, at operation 514, the process 500 includes determining that the contact point of the line 518 and a second line that extends along the map segment 512 is outside the map segment 512. In some cases, at operation 514, the process 500 includes determining that the image point 506 has no longitudinal mismatch with respect to the map segment 512 because the contact point 516 falls outside the map segment 512.

At operation 520, the process 500 includes determining a second error associated with the image point 506 and the map segment 512 based on a shortest distance 522 from a ray that passes through the image point 506 to a map point of the map segment 512 that is closer to the image point (in this example, the lower map point). In some cases, the ray passes through and/or has an endpoint in a defined location in the environment model, such as a camera location within the environment model.

Figure 6:
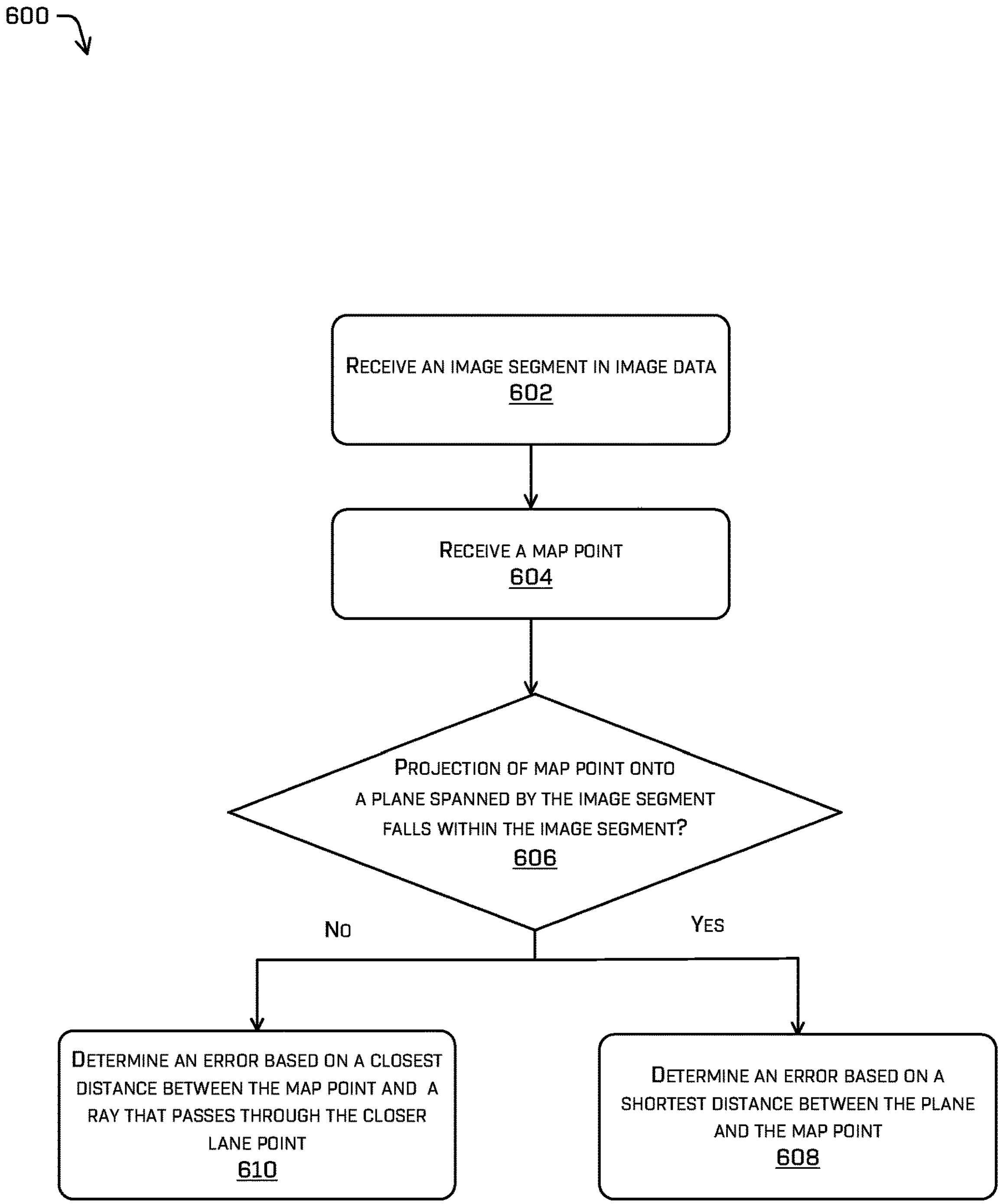
FIG. 6 is a flowchart diagram of an example process for determining a first error measure associated with an image segment and a map point.

FIG. 6 is a flowchart diagram of an example process 600 for determining a first error measure associated with an image segment and a map point. As depicted in FIG. 6, at operation 602, the process 600 includes receiving an image segment. The image segment may be defined by two image points in the image data that are detected to depict a lane marking.

At operation 604, the process 600 includes receiving a map point. The map point may be a point in the environment model of the vehicle environment (e.g., a three-dimensional environment model) that is determined based on a map coordinate associated with a lane marking as represented by the map data.

At operation 606, the process 600 includes determining whether a projection of the map point onto a plane spanned by the image segment falls within the image segment. In some cases, if the projection falls outside the image segment, an example system determines that the map point and the image segment have a longitudinal mismatch with respect to each other. In some cases, if the projection falls inside the image segment, an example system determines that the map point and the image segment do not have a longitudinal mismatch with respect to each other. A longitudinal mismatch between a map point and an image segment may occur if no portion of the image segment is aligned with the map point along a longitudinal axis of the environment model (e.g., a three-dimensional environment model).

At operation 608, the process 600 includes, based on determining that the projection of the map point onto the plane spanned by the image segment falls within the image segment, determining the first error based on a shortest distance between the plane and the map point. In some cases, the distance between the map segment $C_{Z_i,j}$ and the plane that spans the image segment $L_{D_n,m}$ is determined based on the output of $$f_{XP}(C_{Z_{i,j}}, L_{D_{n,m}}) = \left| \frac{C_{D_n,m} \times C_{D_n,m+1}}{\left\| C_{D_n,m} \times C_{D_n,m+1} \right\|_2} \cdot C_{Z_i,j} \right|.$$

At operation 610, the process 600 includes, based on determining that the projection of the map point onto the plane spanned by the image segment falls outside the image segment, determining the first error based on a lesser of: (i) a shortest distance from a ray that passes through a first image point of the lane segment and the map segment, or (ii) a shortest distance from a ray that passes through a second image point of the lane segment and the map segment. Accordingly, in some cases, based on determining that the projection of the map point onto the plane spanned by the image segment falls outside the image segment, the first error is determined based on a shortest distance from the map point to a ray that passes through the image point of the lane segment that is closer to the map point.

Figure 7:
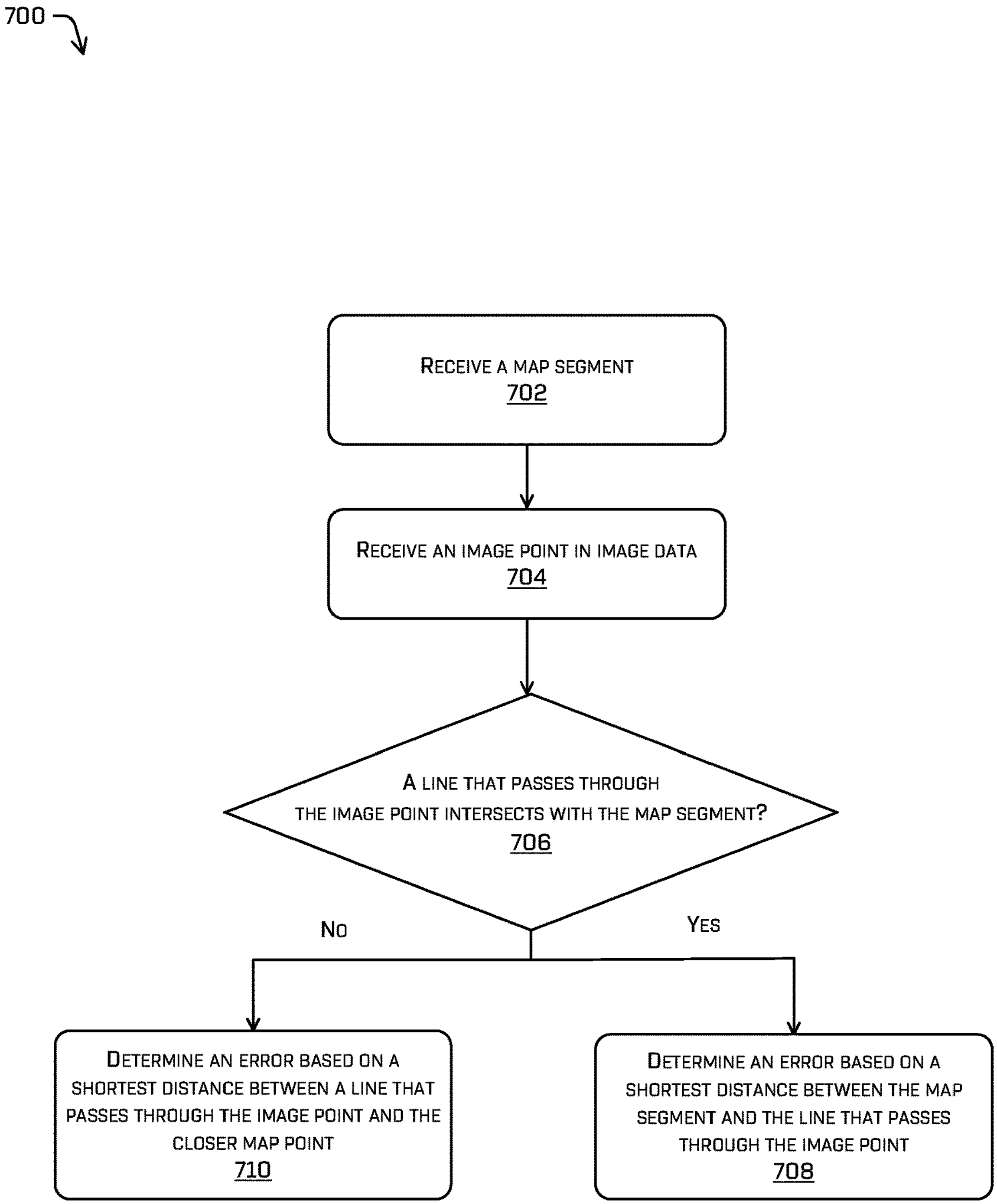
FIG. 7 is a flowchart diagram of an example process for determining a second error measure associated with a map segment and an image point.

FIG. 7 is a flowchart diagram of an example process 700 for determining a second error measure associated with a map segment and an image point. As depicted in FIG. 7, at operation 702, the process 700 includes receiving a map segment. The map segment may be defined by map points in the environment model of the vehicle environment (e.g., a three-dimensional environment model) that are determined based on map coordinates associated with a lane marking as represented by the map data.

At operation 704, the process 700 includes receiving an image point. The map point may be a point in the image data associated with the vehicle environment that is detected to depict at least a portion of a lane marking.

At operation 706, the process 700 includes determining whether a line that passes through the image point intersects with the map segment. In some cases, the line may be associated with (e.g., may extend along) a ray that passes through the image point. The ray may be defined by the image point and a predefined location within the vehicle environment (e.g., a predefined camera location within the vehicle environment). In some cases, if the line intersects with the map segment, an example system determines that the map segment and the image point do not have a longitudinal mismatch with respect to each other. In some cases, if the line does not intersect with the map segment, an example system determines that the map segment and the image point have a longitudinal mismatch with respect to each other. A longitudinal mismatch between an image point and a map segment may occur if no portion of the map segment is aligned with the image point along a longitudinal axis of the environment model (e.g., a three-dimensional environment model).

At operation 708, the process 700 includes, based on determining that the line that passes through the image point intersects with the map segment, determining the second error based on a shortest distance between the map segment and the line that passes through the image point. The shortest distance between the map segment and the line that passes through the image point is one example of a distance measure for determining a distance between a three-dimensional point and a three-dimensional line. However, a person of ordinary skill in the relevant technology will recognize that other distance measures may be utilized.

At operation 710, the process 700 includes, based on determining that the line that passes through the image point does not intersect with the map segment, determining the second error based on a lesser of: (i) a shortest distance from a ray that passes through the image point and a first map point of the map segment, or (ii) a shortest distance from the ray and a second map point of the map segment. Accordingly, in some cases, based on determining that the line that passes through the image point does not intersect with the map segment, the second error is determined based on a shortest distance from a ray that passes through the image point and a map point of the map segment that is closer to the image point.

Figure 8:
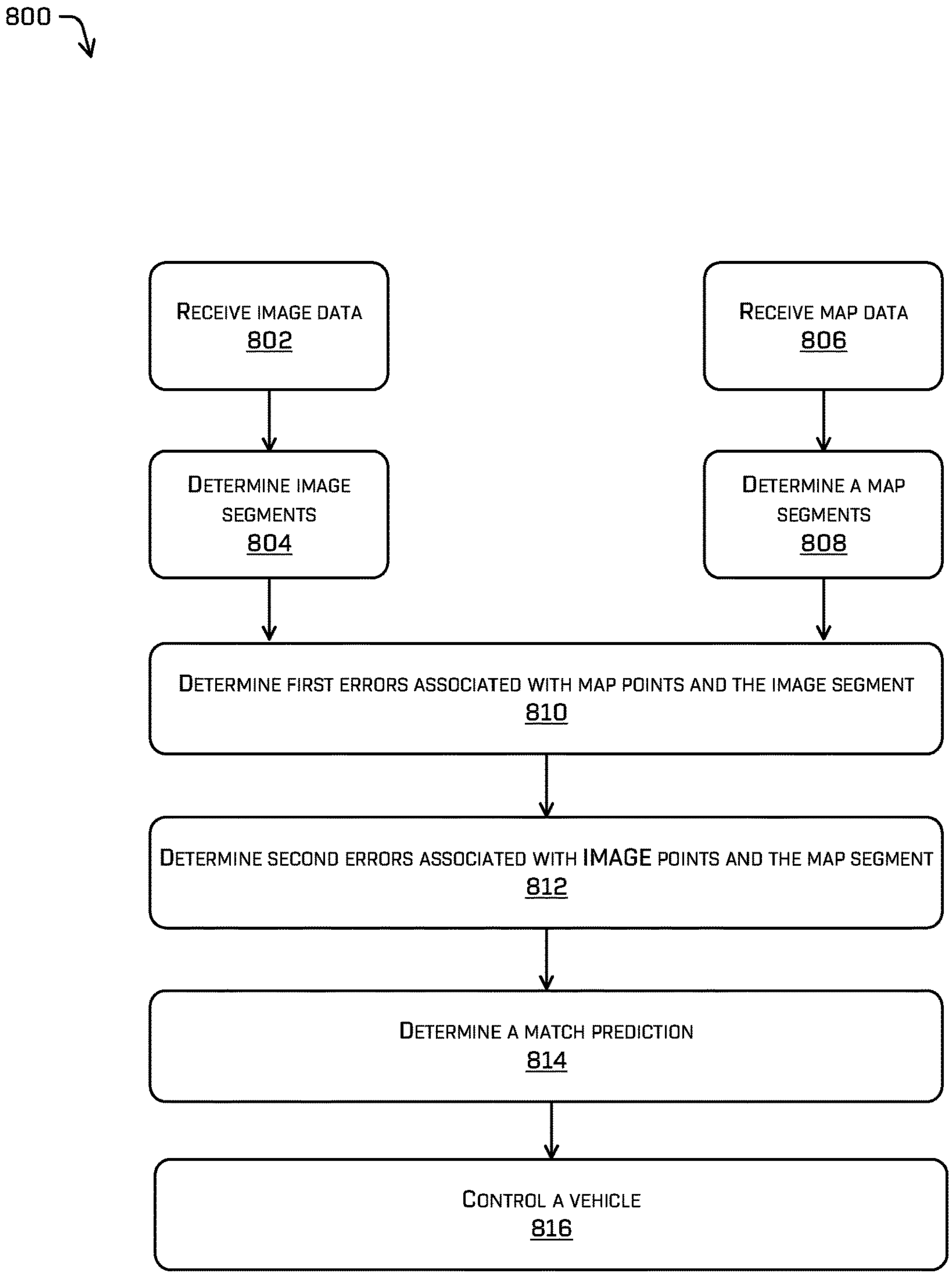
FIG. 8 is a flowchart diagram of an example process for controlling a vehicle based on image data and map data associated with the vehicle environment.

FIG. 8 is a flowchart diagram of an example process 800 for controlling a vehicle based on image data and map data associated with the vehicle environment. As depicted in FIG. 8, at operation 802, the process 800 includes receiving the image data. The image data may be captured by one or more cameras associated with the camera. A camera may be any kind of an image sensor. Examples of cameras include visible light spectrum cameras, infrared cameras, depth cameras, and/or the like. Although various operations are described with reference to determining match predictions based on image data, a person of ordinary skill in the relevant technology will recognize that other types of sensor data (e.g., lidar data, radar data, ultrasonic sensor data, and/or the like) may be utilized in addition to and/or instead of image data.

At operation 804, the process 800 includes determining one or more image segments based on the image data. In some cases, the image data is processed (e.g., by an image processing model, such as an image processing model that includes a machine learning model such as a convolutional neural network model) to determine a set of image points associated with one or more detected lane marking. The set of image points may be grouped into one or more sequences of image points each associated with a respective one of the detected lane markings. An image point may represent a position (e.g., a pixel) within the image data that is detected to depict at least a portion of a detected lane marking. An image segment may be defined by two image points, such as two consecutive image points.

At operation 806, the process 800 receiving map data. The map data may represent one or more map coordinates that correspond to recorded locations of one or more lane markings. In some cases, a map coordinate represents a defined position within the map data that is recorded to correspond to a location of at least a portion of a lane marking in the vehicle environment.

At operation 808, the process 800 includes determining one or more map segments based on the map data. In some cases, one or more map coordinates associated with one or more recorded lane markings are projected into a vehicle environment model (e.g., a three-dimensional environment model) to determine one or more map points. A map segment may be defined by two map points, such as two consecutive map points.

At operation 810, the process 800 includes determining a set of first errors associated with the map points determined based on the map data and the image segments determined based on the image data. In some cases, each first error is a measure of error associated with a respective map point and a respective image segment. Exemplary techniques for determining first errors associated with map points and image segments are described above in FIGS. 2-3 and 6.

At operation 812, the process 800 includes determining a set of second errors associated with the image points determined based on the image data and the map segments determined based on the map data. In some cases, each second error is a measure of error associated with a respective image point and a respective map segment. Exemplary techniques for determining second errors associated with image points and map segments are described above in FIGS. 4-5 and 7.

At operation 814, the process 800 includes determining a match prediction based on the set of first errors and the second errors. In some cases, the match prediction represents at least one of: (i) for each map point of at least one of the map points, a respective match error determined based on the set of first errors associated with the map point, or (ii) for each image point of at least one of the image points, a respective match error determined based on the set of second errors associated with the image point. In some cases, the match prediction additionally represents which image points in the vehicle environment (if any) are associated with a longitudinal mismatch with respect to all of the determined map segments associated with the vehicle environment. In some cases, the match prediction additionally represents which map points in the vehicle environment (if any) are associated with a longitudinal mismatch with respect to all of the determined image segments associated with the vehicle environment.

In some cases, the match error for a map point is determined based on at least one of the following: (i) if the set of first errors associated with the map point represent that the map point does not match any of the determined image segments associated with the vehicle environment, a predefined value (e.g., a positive infinity value), or (ii) if the set of first errors associated with the map point represent that the map point matches at least one of the determined image segments associated with the vehicle environment, the minimum first error associated with the map point. In some cases, the match error for an image point is determined based on at least one of the following: (i) if the set of second errors associated with the image point represent that the image point does not match any of the determined map segments associated with the vehicle environment, a predefined value (e.g., a positive infinity value), or (ii) if the set of second errors associated with the image point represent that the image point matches at least one of the determined map segments associated with the vehicle environment, the minimum second error associated with the image point.

At operation 816, the process 800 includes controlling the vehicle based on the match prediction. In some cases, controlling the vehicle includes determining a location of a lane marking in a vehicle location based on the match prediction, determining a recommended trajectory for the vehicle based on the determined location, and controlling the vehicle based on the recommended trajectory. In some cases, controlling the vehicle includes determining that the map data associated with the vehicle environment includes erroneous data (e.g., a map point with a longitudinal mismatch, a map point that does not match with any image segments detected based on the corresponding image data, and/or the like), updating the map data based on the erroneous data, determining a recommended trajectory for the vehicle based on the updated map data, and controlling the vehicle based on the recommended trajectory. In some cases, controlling the vehicle includes determining that image data associated with the vehicle environment includes erroneous data (e.g., an image point with a longitudinal mismatch, an image point that does not match with any map segments detected based on the corresponding map data, and/or the like), updating the image data based on the erroneous data, determining a recommended trajectory for the vehicle based on the updated image data, and controlling the vehicle based on the recommended trajectory.

Figure 9:
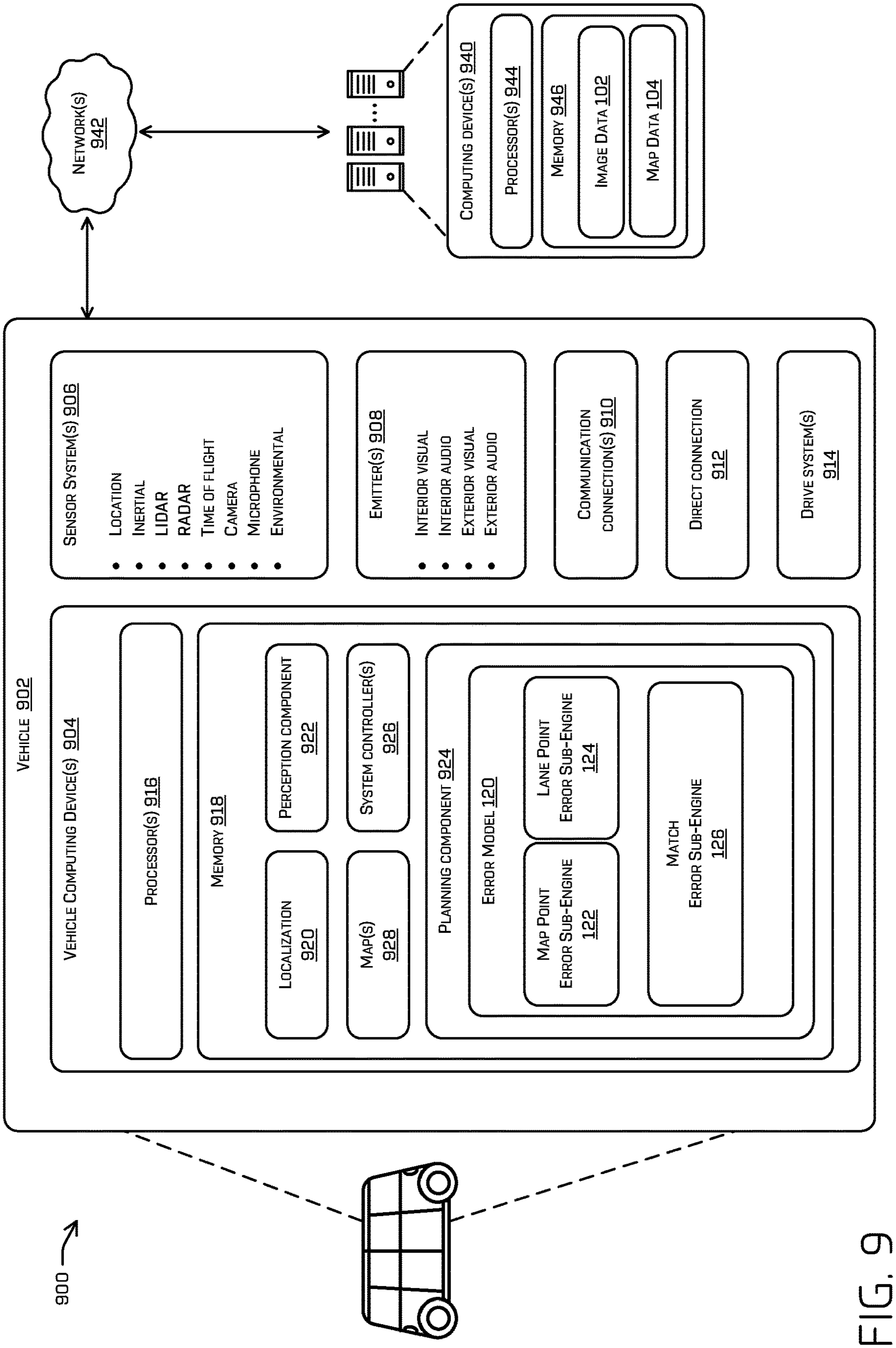
FIG. 9 depicts a block diagram of an example system for implementing the techniques described herein.

FIG. 9 depicts a block diagram of an example system 900 for implementing the techniques described herein. In at least one example, the system 900 may include a vehicle 902.

The vehicle 902 may include a vehicle computing device 904, one or more sensor systems 906, one or more emitters 908, one or more communication connections 910, at least one direct connection 912, and one or more drive systems 914.

The vehicle computing device 904 may include one or more processors 916 and memory 918 communicatively coupled with the one or more processors 916. In the illustrated example, the vehicle 902 is an autonomous vehicle; however, the vehicle 902 could be any other type of vehicle. In the illustrated example, the memory 918 of the vehicle computing device 904 stores a localization component 920, a perception component 922, a planning component 924, one or more system controllers 926, and one or more maps 928. Though depicted in FIG. 9 as residing in memory 918 for illustrative purposes, it is contemplated that the localization component 920, the perception component 922, the planning component 924, the one or more system controllers 926, and the one or more maps 928 may additionally, or alternatively, be accessible to the vehicle 902 (e.g., stored remotely).

In at least one example, the localization component 920 may include functionality to receive data from the sensor system(s) 906 to determine a position of the vehicle 902. For example, the localization component 920 may include and/or request/receive a three-dimensional map of an environment and may continuously determine a location of the autonomous vehicle within the map. In some instances, the localization component 920 may utilize SLAM (simultaneous localization and mapping) or CLAMS (calibration, localization and mapping, simultaneously) to receive image data, lidar data, radar data, IMU data, GPS data, wheel encoder data, and the like to accurately determine a location of the autonomous vehicle. In some instances, the localization component 920 may provide data to various components of the vehicle 902 to determine an initial position of an autonomous vehicle for generating a candidate trajectory.

In some instances, the perception component 922 may include functionality to perform object detection, segmentation, and/or classification. In some examples, the perception component 922 may provide processed sensor data that indicates a presence of an entity that is proximate to the vehicle 902 and/or a classification of the entity as an entity type (e.g., car, pedestrian, cyclist, building, tree, road surface, curb, sidewalk, unknown, road feature, etc.). In examples, the perception component 922 may process sensor data to identify a road feature (e.g., an intersection, parking lane, signal light, stop sign, etc.), determine a proximity of the road feature to the vehicle 902, and/or provide data regarding the road feature (e.g., proximity, etc.) as processed sensor data. In additional and/or alternative examples, the perception component 922 may provide processed sensor data that indicates one or more characteristics associated with a detected entity and/or the environment in which the entity is positioned. In some examples, characteristics associated with an entity may include, but are not limited to, an x-position, a y-position, a z-position, an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In examples, the perception component 922 may include the error prediction engine 120 of FIG. 1 and at least one of its components. For example, the perception component 922 may include the map point error sub-engine 122, the image point error sub-engine 124, and/or a match error sub-engine 126.

In examples, the planning component 924 may determine a path for the vehicle 902 to follow to traverse through an environment. For example, the planning component 924 may determine various routes and trajectories and various levels of detail. For example, the planning component 924 may determine a route to travel from a first location (e.g., a current location) to a second location (e.g., a target location). For the purpose of this discussion, a route may be a sequence of waypoints for travelling between two locations. As non-limiting examples, waypoints include streets, intersections, GPS coordinates, etc. Further, the planning component 924 may generate an instruction for guiding the autonomous vehicle along at least a portion of the route from the first location to the second location. In at least one example, the planning component 924 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique.

In at least one example, the one or more system controllers 926 may be configured to control steering, propulsion, braking, safety, emitters, communication, and other systems of the vehicle 902. The system controller(s) 926 may communicate with and/or control corresponding systems of the drive system(s) 914 and/or other components of the vehicle 902.

The memory 918 may further include the one or more maps 928 that may be used by the vehicle 902 to navigate within the environment. For example, a map may be any number of data structures modeled in two dimensions or three dimensions that are capable of providing information about an environment, such as, but not limited to, topologies (such as intersections), streets, mountain ranges, roads, terrain, and the environment in general. In one example, a map may include a three-dimensional mesh. In some instances, the map may be stored in a tiled format, such that individual tiles of the map represent a discrete portion of an environment, and may be loaded into working memory as needed. In some instances, the map(s) 928 may be divided into tiles by the vehicle computing device 904, by a computing device(s) 940, or by a combination of the two.

In some examples, the one or more maps 928 may be stored on a remote computing device(s) (such as the computing device(s) 940) accessible via network(s) 942. In some examples, multiple maps 928 may be stored based on, for example, a characteristic (e.g., type of entity, time of day, day of week, season of the year, etc.). Storing multiple maps 928 may have similar memory requirements, but increase the speed at which data in a heat map may be accessed.

In some instances, aspects of some or all of the components discussed herein may include any models, algorithms, and/or machine learning algorithms. For example, in some instances, the components in the memory 918 may be implemented as a neural network.

As described herein, an exemplary neural network passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

In at least one example, the sensor system(s) 906 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 906 may include multiple instances of each of these or other types of sensors. For instance, the lidar sensors may include individual lidar sensors located at the corners, front, back, sides, and/or top of the vehicle 902. As another example, the camera sensors may include multiple cameras disposed at various locations about the exterior and/or interior of the vehicle 902. The sensor system(s) 906 may provide input to the vehicle computing device 904. Additionally, and/or alternatively, the sensor system(s) 906 may send sensor data, via the one or more networks 942, to the one or more computing device(s) 940 at a particular frequency, after a lapse of a predetermined period of time, in near real-time, etc.

The vehicle 902 may also include the one or more emitters 908 for emitting light and/or sound, as described above. The emitters 908 in this example include interior audio and visual emitters to communicate with passengers of the vehicle 902. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 908 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 902 may also include the one or more communication connection(s) 910 that enable communication between the vehicle 902 and one or more other local or remote computing device(s). For instance, the communication connection(s) 910 may facilitate communication with other local computing device(s) on the vehicle 902 and/or the drive system(s) 914. Also, the communication connection(s) 910 may allow the vehicle to communicate with other nearby computing device(s) (e.g., other nearby vehicles, traffic signals, etc.). The communication connection(s) 910 also enable the vehicle 902 to communicate with a remote teleoperations computing device or other remote services.

The communications connection(s) 910 may include physical and/or logical interfaces for connecting the vehicle computing device 904 to another computing device or a network, such as the network(s) 942. For example, the communications connection(s) 910 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 902 may include the one or more drive systems 914. In some examples, the vehicle 902 may have a single drive system 914. In at least one example, if the vehicle 902 has multiple drive systems 914, individual drive systems 914 may be positioned on opposite ends of the vehicle 902 (e.g., the front and the rear, etc.). In at least one example, the drive system(s) 914 may include one or more sensor systems to detect conditions of the drive system(s) 914 and/or the surroundings of the vehicle 902. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 914. In some cases, the sensor system(s) on the drive system(s) 914 may overlap or supplement corresponding systems of the vehicle 902 (e.g., sensor system(s) 906).

The drive system(s) 914 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 914. Furthermore, the drive system(s) 914 also include one or more communication connection(s) that enable communication by the respective drive module with one or more other local or remote computing device(s).

In at least one example, the localization component 920, perception component 922, and/or the planning component 924 may process sensor data, as described above, and may send their respective outputs, over the one or more network(s) 942, to the one or more computing device(s) 940. In at least one example, the localization component 920, the perception component 922, and/or the planning component 924 may send their respective outputs to the one or more computing device(s) 940 at a particular frequency, after a lapse of a predetermined period of time, in near real-time, etc.

The vehicle 902 may send sensor data to the one or more computing device(s) 940, via the network(s) 942. In some examples, the vehicle 902 may send raw sensor data to the computing device(s) 940. In other examples, the vehicle 902 may send processed sensor data and/or representations of sensor data to the computing device(s) 940. In some examples, the vehicle 902 may send sensor data to the computing device(s) 940 at a particular frequency, after a lapse of a predetermined period of time, in near real-time, etc. In some cases, the vehicle 902 may send sensor data (raw or processed) to the computing device(s) 940 as one or more log files. The computing device(s) 940 may receive the sensor data (raw or processed) and may generate and/or update maps based on the sensor data.

In examples, the vehicle 902 may generate various log file(s) representing sensor data captured by the vehicle 902. For example, a log file may include, but is not limited to, sensor data captured by one or more sensors of the vehicle 902 (e.g., lidar sensors, radar sensors, sonar sensors, wheel encoders, inertial measurement units (IMUs) (which may include gyroscopes, magnetometers, accelerometers, etc.), GPS sensors, image sensors, and the like), route information, localization information, and the like. In some cases, a log file(s) may include a log of all sensor data captured by the vehicle 902, decisions made by the vehicle 902, determinations made regarding segmentation and/or classification, and the like. A log files(s) may be sent to and received by the computing device(s) 940.

In at least one example, the computing device(s) 940 may include one or more processors 944 and memory 946 communicatively coupled with the one or more processors 944. In the illustrated example, the memory 946 stores the image data 102 and/or the map data 104 associated with the vehicle environment.

Although illustrated as being implemented on the computing device(s) 940, any of the components of the vehicle computing device(s) 904 may alternatively, or additionally, be implemented by the computing device(s) 940.

The processor(s) 916 of the vehicle 902 and the processor(s) 944 of the computing device(s) 940 may be any suitable processor capable of executing instructions to process data and perform operations as described herein. By way of example and not limitation, the processor(s) 916 and 944 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 918 and memory 946 are examples of non-transitory computer-readable media. Memory 918 and memory 946 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 9 is illustrated as a distributed system, in alternative examples, components of the vehicle 902 may be associated with the computing device(s) 940 and/or components of the computing device(s) 940 may be associated with the vehicle 902. That is, the vehicle 902 may perform one or more of the functions associated with the computing device(s) 940, and vice versa.

CONCLUSION

While one or more examples of the techniques described herein have been described, various alterations, additions, permutations and equivalents thereof are included within the scope of the techniques described herein. As can be understood, the components discussed herein are described as divided for illustrative purposes. However, the operations performed by the various components can be combined or performed in any other component. It should also be understood that components or steps discussed with respect to one example or implementation may be used in conjunction with components or steps of other examples. For example, the components and instructions of FIG. 9 may utilize the processes and flows of FIGS. 1-8.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two-dimensions (e.g., using an x-y coordinate system) or three-dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, fect, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

EXAMPLE CLAUSES

While the example clauses described below are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

A: A system comprising: one or more processors; and one or more non-transitory computer-readable media storing computer-executable instructions that, when executed, cause the one or more processors to perform operations comprising: receiving image data captured by a sensor associated with an autonomous vehicle; receiving map data representing an environment in which the autonomous vehicle is navigating, the map data representing a map segment associated with a lane marking and defined by a first map point and a second map point; detecting, based at least in part on the image data, an image segment defined by a first image point and a second image point; determining a first error based at least in part on a shortest distance from the first map point to a plane defined by the first image point and the second image point; determining a second error based at least in part on a shortest distance from a line defined by a ray passing through the first image point to the map segment; determining a match prediction associated with the map data and the image data based on the first error and the second error; and controlling the autonomous vehicle based on the match prediction.

B: The system of paragraph A, wherein determining the first error further comprises determining whether a point of the plane that is associated with a projection of the first map point is within the image segment.

C: The system of paragraph B, wherein determining the first error further comprises: based on determining that the point falls outside the image segment as the lesser of: a shortest distance from a ray passing through the first image point to the first map point, or a shortest distance from a ray passing through the second image point to the first map point.

D: The system of any of paragraphs A-C, wherein determining the second error comprises: determining whether a point of contact of the line is within the map segment.

E: The system of paragraph D, wherein determining the second error further comprises: based on determining the point of contact is outside the image segment as the lesser of: a shortest distance from the ray to the first map point, or a shortest distance from the ray to the second map point.

F: One or more non-transitory computer-readable media storing instructions executable by one or more processors, wherein the instructions, when executed, cause the one or more processors to perform operations comprising: receiving sensor data representing an environment associated with a vehicle; receiving map data representing an environment in which the vehicle is navigating, the map data representing a map segment associated with a lane marking and defined by a first map point and a second map point; detecting, based at least in part on the sensor data, a sensor data segment defined by a first image point and a second image point; determining a first error based at least in part on the first map point and the sensor data segment; determining a second error based at least in part on the first map point and the first image point; and controlling the vehicle based at least in part on the first error and the second error.

G: The one or more non-transitory computer-readable media of paragraph F, the operations further comprising: detecting, based at least in part on the sensor data, a plurality of sensor data segments comprising the sensor data segment and a second sensor data segment; determining a third error based at least in part on the first map point and the second sensor data segment; determining, based at least in part on the first error and the third error, whether the first map point matches one of the plurality of sensor data segments; determining a first match error associated with the first map point based on at least in part on: (i) whether the first map point matches one of the plurality of sensor data segments, and (ii) a minimum error associated with the first map point in relation to the plurality of sensor data segments; and controlling the vehicle based on the first match error.

H: The one or more non-transitory computer-readable media of paragraph F or G, the operations further comprising: determining, based at least in part on the map data, a plurality of map segments comprising the map segment and a second map segment; determining a fourth error based at least in part on the first image point and the second map segment; determining, based at least in part on the second error and the fourth error, whether the first image point matches one of the plurality of map segments; determining a second match error associated with the first image point based on at least in part on: (i) whether the first image point matches one of the plurality of map segments, and (ii) a minimum error associated with the first image point in relation to the plurality of map segments; and controlling the vehicle based on the second match error.

I: The one or more non-transitory computer-readable media of any of paragraphs F-H, the operations further comprising: detecting, based on the sensor data, the first image point and the second image point; determining a spline function based at least in part on the first image point and the second image point; and determining the sensor data segment based on the spline function.

J: The one or more non-transitory computer-readable media of any of paragraphs F-I, the operations further comprising: detecting, based on the sensor data, a sequence of sensor data segments comprising the sensor data segment; determining that the sensor data segment is at least one of an initial sensor data segment or a last sensor data segment in the sequence; and determining the sensor data segment based on a line segment that passes through one of the first image point or the second image point and ends at another one of the first image point or the second image point.

K: The one or more non-transitory computer-readable media of any of paragraphs F-J, the operations further comprising: determining, based on the map data, a sequence of map segments comprising the map segment; determining that the map segment is at least one of an initial map segment or a last map segment in the sequence; and determining the map segment based on a line segment that passes through one of the first map point or the second map point and ends at another one of the first map point or the second map point.

L: The one or more non-transitory computer-readable media of any of paragraphs F-K, wherein determining the first error comprises: determining the first error based at least in part on a shortest distance from the first map point to a plane defined by the first image point and the second image point.

M: The one or more non-transitory computer-readable media of paragraph L, wherein determining the first error further comprises determining whether a point of the plane that is associated with a projection of the first map point is within the sensor data segment.

N: The one or more non-transitory computer-readable media of paragraph M, wherein determining the first error further comprises: based on determining that the point falls outside the sensor data segment as the lesser of: a shortest distance from a ray passing through the first image point to the first map point, or a shortest distance from a ray passing through the second image point to the first map point.

O: The one or more non-transitory computer-readable media of any of paragraphs F-N, wherein determining the second error comprises: determining the second error based at least in part on a shortest distance from a line defined by a ray passing through the first image point to the map segment.

P: The one or more non-transitory computer-readable media of paragraph O, wherein determining the second error further comprises: determining whether a point of contact of the line is within the map segment.

Q: The one or more non-transitory computer-readable media of paragraph P, wherein determining the second error further comprises: based on determining the point of contact is outside the sensor data segment as the lesser of: a shortest distance from the ray to the first map point, or a shortest distance from the ray to the second map point.

R: A method comprising: receiving sensor data representing an environment associated with a vehicle; receiving map data representing an environment in which the vehicle is navigating, the map data representing a map segment associated with a lane marking and defined by a first map point and a second map point; detecting, based at least in part on the sensor data, a sensor data segment defined by a first image point and a second image point; determining a first error based at least in part on the first map point and the sensor data segment; determining a second error based at least in part on the first map point and the first image point; and controlling the vehicle based at least in part on the first error and the second error.

S: The method of paragraph R, further comprising: detecting, based at least in part on the sensor data, a plurality of sensor data segments comprising the sensor data segment and a second sensor data segment; determining a third error based at least in part on the first map point and the second sensor data segment; determining, based at least in part on the first error and the third error, whether the first map point matches one of the plurality of sensor data segments; determining a first match error associated with the first map point based on at least in part on: (i) whether the first map point matches one of the plurality of sensor data segments, and (ii) a minimum error associated with the first map point in relation to the plurality of sensor data segments; and controlling the vehicle based on the first match error.

T: The method of paragraph R or S, further comprising: determining, based at least in part on the map data, a plurality of map segments comprising the map segment and a second map segment; determining a fourth error based at least in part on the first image point and the second map segment; determining, based at least in part on the second error and the fourth error, whether the first image point matches one of the plurality of map segments; determining a second match error associated with the first image point based on at least in part on: (i) whether the first image point matches one of the plurality of map segments, and (ii) a minimum error associated with the first image point in relation to the plurality of map segments; and controlling the vehicle based on the second match error.

What is claimed is:

1. One or more non-transitory computer-readable media storing instructions executable by one or more processors, wherein the instructions, when executed, cause the one or more processors to perform operations comprising:

receiving sensor data representing an environment associated with a vehicle;

receiving map data representing the environment in which the vehicle is navigating, the map data representing a map segment associated with a lane marking and the map segment defined by a first map point and a second map point;

detecting, based at least in part on the sensor data, a sensor data segment defined by a first image point and a second image point;

defining a plane based at least in part on the first image point and the second image point, wherein defining the plane comprises:

outputting the plane to span at least the sensor data segment and to include a pre-defined center point;

determining a first error based at least in part on a shortest distance from the first map point of the map segment to the plane defined the first image point and the second image point of the sensor data segment;

determining a second error based at least in part on the first map point and the first image point, wherein determining the second error is based on a shortest distance from the map segment to a line that extends along a ray passing through the first image point; and controlling the vehicle based at least in part on the first error and the second error.

2. The one or more non-transitory computer-readable media of claim 1, the operations further comprising:

detecting, based at least in part on the sensor data, a plurality of sensor data segments comprising the sensor data segment and a second sensor data segment;

determining a third error based at least in part on the first map point and the second sensor data segment;

determining, based at least in part on the first error and the third error, whether the first map point matches one of the plurality of sensor data segments;

determining a first match error associated with the first map point based on at least in part on: (i) whether the first map point matches one of the plurality of sensor data segments, and (ii) a minimum error associated with the first map point in relation to the plurality of sensor data segments; and controlling the vehicle based on the first match error.

3. The one or more non-transitory computer-readable media of claim 1, the operations further comprising:

determining, based at least in part on the map data, a plurality of map segments comprising the map segment and a second map segment;

determining a fourth error based at least in part on the first image point and the second map segment;

determining, based at least in part on the second error and the fourth error, whether the first image point matches one of the plurality of map segments;

determining a second match error associated with the first image point based on at least in part on: (i) whether the first image point matches one of the plurality of map segments, and (ii) a minimum error associated with the first image point in relation to the plurality of map segments; and controlling the vehicle based on the second match error.

4. The one or more non-transitory computer-readable media of claim 1, the operations further comprising:

detecting, based on the sensor data, the first image point and the second image point;

determining a spline function based at least in part on the first image point and the second image point; and determining the sensor data segment based on the spline function.

5. The one or more non-transitory computer-readable media of claim 1, the operations further comprising:

detecting, based on the sensor data, a sequence of sensor data segments comprising the sensor data segment;

determining that the sensor data segment is at least one of an initial sensor data segment or a last sensor data segment in the sequence; and determining the sensor data segment based on a line segment that passes through one of the first image point or the second image point and ends at another one of the first image point or the second image point.

6. The one or more non-transitory computer-readable media of claim 1, the operations further comprising:

determining, based on the map data, a sequence of map segments comprising the map segment;

determining that the map segment is at least one of an initial map segment or a last map segment in the sequence; and determining the map segment based on a line segment that passes through one of the first map point or the second map point and ends at another one of the first map point or the second map point.

7. The one or more non-transitory computer-readable media of claim 1, wherein determining the first error further comprises:

projecting, as a projected map point, the first map point onto the plane; and determining whether the projected map point is within the sensor data segment.

8. The one or more non-transitory computer-readable media of claim 7, wherein determining the first error further comprises:

based on determining that the point falls outside the sensor data segment, determining the first error as the lesser of:

a shortest distance from a ray passing through the first image point to the first map point, or a shortest distance from a ray passing through the second image point to the first map point.

9. The one or more non-transitory computer-readable media of claim 1, wherein determining the second error comprises:

determining the second error based at least in part on a shortest distance from the first map point to the line defined by the ray.

10. The one or more non-transitory computer-readable media of claim 9, wherein determining the second error further comprises:

determining whether a point of contact of the line with a second line that extends along the map segment is within the map segment.

11. The one or more non-transitory computer-readable media of claim 10, wherein determining the second error further comprises:

based on determining the point of contact is outside the sensor data segment, determining the first error as the lesser of:

a shortest distance from the ray to the first map point, or a shortest distance from the ray to the second map point.

12. A method comprising:

receiving sensor data representing an environment associated with a vehicle;

receiving map data representing the environment in which the vehicle is navigating, the map data representing a map segment associated with a lane marking and the map segment defined by a first map point and a second map point;

detecting, based at least in part on the sensor data, a sensor data segment defined by a first image point and a second image point;

defining a plane based at least in part on the first image point and the second image point, wherein defining the plane comprises:

outputting the plane to span at least the sensor data segment and to include a pre-defined center point;

determining a first error based at least in part on a shortest distance from the first map point of the map segment to the plane defined the first image point and the second image point of the sensor data segment;

determining a second error based at least in part on the first map point and the first image point, wherein determining the second error is based on a shortest distance from the map segment to a line that extends along a ray passing through the first image point; and controlling the vehicle based at least in part on the first error and the second error.

13. The method of claim 12, further comprising:

detecting, based at least in part on the sensor data, a plurality of sensor data segments comprising the sensor data segment and a second sensor data segment;

determining a third error based at least in part on the first map point and the second sensor data segment;

determining, based at least in part on the first error and the third error, whether the first map point matches one of the plurality of sensor data segments;

determining a first match error associated with the first map point based on at least in part on: (i) whether the first map point matches one of the plurality of sensor data segments, and (ii) a minimum error associated with the first map point in relation to the plurality of sensor data segments; and controlling the vehicle based on the first match error.

14. The method of claim 12, further comprising:

determining, based at least in part on the map data, a plurality of map segments comprising the map segment and a second map segment;

determining a fourth error based at least in part on the first image point and the second map segment;

determining, based at least in part on the second error and the fourth error, whether the first image point matches one of the plurality of map segments;

determining a second match error associated with the first image point based on at least in part on: (i) whether the first image point matches one of the plurality of map segments, and (ii) a minimum error associated with the first image point in relation to the plurality of map segments; and controlling the vehicle based on the second match error.

15. A system comprising:

one or more processors; and one or more non-transitory computer-readable media storing computer-executable instructions that, when executed, cause the one or more processors to perform operations comprising:

receiving sensor data representing an environment associated with a vehicle;

receiving map data representing the environment in which the vehicle is navigating, the map data representing a map segment associated with a lane marking and the map segment defined by a first map point and a second map point;

detecting, based at least in part on the sensor data, a sensor data segment defined by a first image point and a second image point;

defining a plane based at least in part on the first image point and the second image point, wherein defining the plane comprises:

outputting the plane to span at least the sensor data segment and to include a pre-defined center point;

determining a first error based at least in part on a shortest distance from the first map point of the map segment to the plane defined the first image point and the second image point of the sensor data segment;

determining a second error based at least in part on the first map point and the first image point, wherein determining the second error is based on a shortest distance from the map segment to a line that extends along a ray passing through the first image point; and controlling the vehicle based at least in part on the first error and the second error.

16. The system of claim 15, the operations further comprising:

detecting, based at least in part on the sensor data, a plurality of sensor data segments comprising the sensor data segment and a second sensor data segment;

determining a third error based at least in part on the first map point and the second sensor data segment;

determining, based at least in part on the first error and the third error, whether the first map point matches one of the plurality of sensor data segments;

determining a first match error associated with the first map point based on at least in part on: (i) whether the first map point matches one of the plurality of sensor data segments, and (ii) a minimum error associated with the first map point in relation to the plurality of sensor data segments; and controlling the vehicle based on the first match error.

17. The system of claim 15, the operations further comprising:

determining, based at least in part on the map data, a plurality of map segments comprising the map segment and a second map segment;

determining a fourth error based at least in part on the first image point and the second map segment;

determining, based at least in part on the second error and the fourth error, whether the first image point matches one of the plurality of map segments;

determining a second match error associated with the first image point based on at least in part on: (i) whether the first image point matches one of the plurality of map segments, and (ii) a minimum error associated with the first image point in relation to the plurality of map segments; and controlling the vehicle based on the second match error.

18. The system of claim 15, the operations further comprising:

detecting, based on the sensor data, the first image point and the second image point;

determining a spline function based at least in part on the first image point and the second image point; and determining the sensor data segment based on the spline function.

19. The system of claim 15, the operations further comprising:

detecting, based on the sensor data, a sequence of sensor data segments comprising the sensor data segment;

determining that the sensor data segment is at least one of an initial sensor data segment or a last sensor data segment in the sequence; and determining the sensor data segment based on a line segment that passes through one of the first image point or the second image point and ends at another one of the first image point or the second image point.

20. The system of claim 15, wherein determining the first error further comprises:

projecting, as a projected map point, the first map point onto the plane; and determining whether the projected map point is within the sensor data segment.

* * * * *